United States Patent [19]

Nakamura et al.

[11] Patent Number: 4,987,747
[45] Date of Patent: Jan. 29, 1991

[54] AIR CONDITIONING DEVICE

[75] Inventors: Takashi Nakamura, Wakayama; Naoki Tanaka, Amagasaki; Hitoshi Iijima, Amagasaki; Yoshihiro Sumida, Amagasaki, all of Japan

[73] Assignee: Mitsubishi Denki Kabushiki Kaisha, Tokyo, Japan

[21] Appl. No.: 417,207

[22] Filed: Oct. 4, 1989

[30] Foreign Application Priority Data

| Oct. 17, 1988 | [JP] | Japan | 63-260763 |
| Oct. 17, 1988 | [JP] | Japan | 63-260762 |
| Oct. 28, 1988 | [JP] | Japan | 63-273771 |
| Dec. 12, 1988 | [JP] | Japan | 63-313566 |
| Jan. 24, 1989 | [JP] | Japan | 1-14816 |
| Feb. 17, 1989 | [JP] | Japan | 1-37599 |

[51] Int. Cl.$^5$ .............................. F25B 13/00
[52] U.S. Cl. ............................ 62/160; 62/278; 62/324.6
[58] Field of Search .............. 62/81, 278, 324.6, 160, 62/117

[56] References Cited

U.S. PATENT DOCUMENTS 3,343,375  9/1967  Quick .............................. 62/81

FOREIGN PATENT DOCUMENTS 47-22558  11/1972  Japan.
0050137   4/1979   Japan .............................. 62/324.6
62-56429  11/1987  Japan.

Primary Examiner—William E. Wayner
Attorney, Agent, or Firm—Oblon, Spivak, McClelland, Maier & Neustadt

[57] ABSTRACT

An air conditioning device comprising: a single outdoor unit including a compressor, a four port valve, an outdoor heat exchanger, an accumulator and the like; a plurality of indoor units connected in parallel to the outdoor unit through a first refrigerant-carrying means and a second refrigerant-carrying means; switching valves for selectively connecting one end of the indoor units to either the first refrigerant-carrying means or the second refrigerant-carrying means; and a third refrigerant-carrying means having one end connected to the other end of the indoor units through first flow controllers, and the other end connected to the first refrigerant-carrying means through a second flow controller.

7 Claims, 29 Drawing Sheets

→ ROOM HEATING
--→ ROOM COOLING

→ ROOM HEATING
--→ ROOM COOLING

AIR CONDITIONING DEVICE

The present invention relates to an air conditioning device for multiple rooms wherein a plurality of indoor units are connected to a single outdoor unit, in particular, an air conditioning device wherein room cooling or room heating can be selectively carried on for each indoor unit, or wherein room cooling or room heating can be simultaneously carried out in all indoor units.

There has been known such type of air conditioning device as disclosed in e.g. Japanese Unexamined Utility Model Publication No. 22558/1972.

FIG. 37 is a diagram showing the overall structure of the refrigerant system of the conventional air conditioning device disclosed in this publication.

In FIG. 37, reference numeral 1 designates an outdoor unit of the air conditioning device, as a whole. Reference numeral 2 designates a compressor, reference numeral 3 designates a reversing valve, reference numeral 4 designates an outdoor heat exchanger, reference numeral 5 designates a check valve, reference numeral 6 designates an expansion valve, reference numeral 7 designates a receiver, reference numeral 8 designates an accumulator, and reference numeral 19 designates an outdoor fan. The members indicated with the reference numerals 2 through 8 and 19 constitutes the outdoor unit 1. Reference numerals 9a through 9c designate indoor units which are connected to the outdoor unit 1. Reference numeral 10 designates an indoor heat exchanger, reference numeral 11 designates a check valve, and reference numeral 12 designates an expansion valve. The members indicated with the reference numerals 10 through 12 constitutes the respective indoor units 9a through 9c. Reference numerals 13 and 14 designate a first connecting pipe and a second connecting pipe, respectively, which connect the indoor units 9a through 9c to the outdoor unit 1. Arrows of solid line indicate the flow of a refrigerant in the case of room heating, and arrows of broken line indicate the flow of the refrigerant in the case of room cooling.

The operation of the conventional air conditioning device having such structure will be explained.

On room heating, the gaseous refrigerant which has been discharged from the compressor 2 and has a high temperature and a high pressure flows into the indoor units 9a-9c through the second connecting pipe 14. In the indoor heat exchangers 10 of the indoor units, the refrigerant carries out heat exchanging with (heating) the air in the corresponding rooms to be condensed and liquefied. The refrigerant which has been liquefied in the indoor units 9a-9c passes through the check valves 11, and joins in the first connecting pipe 13. After that, the refrigerant flows into the expansion valve 6 through the receiver 7. In the expansion valve, the refrigerant is depressurized to take a gas-liquid two phase state at a low temperature, and the refrigerant flows into the outdoor heat exchanger 4. The refrigerant which has flowed into the outdoor heat exchanger 4 carries out heat exchanging with external air to be evaporated, thereby becoming a gaseous form so that it can be inspired into the compressor 2 again. In this way, the circulating cycle of the refrigerant is formed.

On the other hand, the room cooling takes the circulating cycle of the refrigerant opposed to that of on room heating. Specifically, the refrigerant which has become a gas having a high temperature and a high pressure by the compressor 2 carries out heat exchanging with external air (i.e. is cooled) in the outdoor heat exchanger 4 to be condensed and liquefied. The liquid refrigerant passes through the receiver 7, and flows into the indoor units 9a-9c through the first connecting pipe 13. The refrigerant which has flowed into the indoor units 9a-9c is depressurized by the expansion valves 12 to take a gas-liquid two phase state of a low temperature. The refrigerant carries out heat exchanging with (room cooling the air in the corresponding rooms in the indoor heat exchangers 10 to become a gaseous state. The gaseous refrigerant joins in the second connecting pipe 14, and is inspired into the compressor 2 again.

The rotation frequency of the compressor 2 on room heating and room cooling is controlled depending on the number and the rating capacity of working indoor units 9a-9c. The outdoor fan 19 is controlled to be driven at the maximum revolution.

Since the conventional multiple room type of air conditioning devices have been constructed as stated earlier, all indoor units 9a-9c must carry out either room heating or room cooling at the same time. As a result, there is a possibility that a room required for cooling is subjected to room heating, and that a room required for heating is subjected to room cooling.

In particular, when such multiple room type air conditioning device is installed in a large-scale building, there can occur a situation wherein interior zones, perimeter zones or ordinary office rooms are totally different from office-automated rooms such as computer rooms in terms of air conditioning load. In the case of e.g. tenant buildings which have rooms for rent, it is impossible to previously fix zoning such as cooling zone and heating zone because whenever a tenant changes heat load changes. Installing an indoor unit for room cooling and an indoor unit for room heating in the same room to cope with the problem as stated just above is not practical because the cost of equipment is high.

It is an object of the present invention to provide an air conditioning device wherein a single outdoor unit is connected to a plurality of indoor units, and room cooling operation and room heat operation can be selectively carried out for each indoor unit, or the room cooling operation or the room heating operation can be simultaneously performed for all indoor units, thereby coping with the requirements of room cooling and room heating of a space with each indoor unit installed in it.

The foregoing and the other objects of the present invention have been attained by providing an air conditioning device comprising a single outdoor unit including a compressor, a reversing valve, an outdoor heat exchanger, an accumulator and the like; a plurality of indoor units connected in parallel to the outdoor unit through a first refrigerant-carrying means and a second refrigerant-carrying means; switching valves for selectively connecting one end of the indoor units to either the first refrigerant-carrying means or the second refrigerant-carrying means; and a third refrigerant-carrying means having one end connected to the other end of the indoor units through first flow controllers, and the other end connected to either the first refrigerant-carrying means or the second refrigerant-carrying means through a second flow controller.

In accordance with the air conditioning device of the present invention can selectively carry out room cooling or room heating for each indoor unit, or simultaneously carry out room cooling or room heating for all indoor units.

In the case of the room cooling and room heating concurrent operation wherein room heating is principally performed, the gaseous refrigerant having a high pressure is introduced from i.e. the second refrigerant-carrying means into each indoor unit for heating to carry out room heating. The refrigerant which has carried out room heating partly flows from the third refrigerant-carrying means into an indoor unit for room cooling, carries out heat exchanging (room cooling), and flows into the first refrigerant-carrying means. The other part of the refrigerant flows into the first refrigerant-carrying means through the third refrigerant-carrying means with the second flow controllers in it, and is combined with the refrigerant which has passed through the indoor unit for room cooling. The combined refrigerant returns to the outdoor unit.

In the case of room cooling and room heating concurrent operation wherein room cooling is principally performed, the gaseous refrigerant having a high pressure carries out heat exchanging in an arbitrary amount in the outdoor heat exchanger to take a two phase state, and is fed toward the indoor units through the first refrigerant-carrying means. A part of the refrigerant is introduced into a room heating indoor unit, heats the room with the room heating indoor unit in it, and flows into the third refrigerant-carrying means. The other part of the refrigerant is introduced into the third refrigerant-carrying means, passes through the second flow controller, is combined with the refrigerant which comes from the room heating indoor unit, and flows into the remaining indoor units for room cooling. The refrigerant which has flowed into the indoor units for room cooling carries out heat exchanging (room cooling). After that, the refrigerant is directed towards the outdoor unit through the second refrigerant-carrying means, and returns to the compressor again.

In the case of room heating only, the refrigerant is introduced from the outdoor unit into the indoor units through the second refrigerant-carrying means. The refrigerant carries out heat exchanging (room heating) in the indoor units, passes through the third refrigerant-carrying means, and returns to the outdoor unit.

In the case of room cooling only, the refrigerant is introduced into the indoor units through the first refrigerant-carrying means and the third refrigerant-carrying means, and carries out heat exchanging (room cooling). The refrigerant which has completed heat exchanging returns to the outdoor unit through the second refrigerant-carrying means.

The present invention offers advantage of providing air conditioning device wherein room cooling operation and room heating operation can be selected for each indoor unit. The addition of the third refrigerant-carrying means for connecting between the indoor units is enough to realize such air conditioning device. The number of long refrigerant-carrying means for connecting between the outdoor unit and the indoor units remains two. The installation work required for the addition of the third refrigerant-carrying means is not difficult, and the expenditure for such installation work is inexpensive.

In drawings:

FIGS. 9-1 and 9-2 are flow charts showing the control flow of the controller of the second embodiment of FIG. 5;

FIGS. 15-1 through FIG. 15-5 are flow charts showing the control flow of the controller of the fourth embodiment;

FIGS. 35-1 through 35-3 are flow charts showing the control flow of the controller of the eleventh embodiment of FIG. 31;

Now, the present invention will be described in detail with reference to preferred embodiments illustrated in the accompanying drawings.

Figure 37:
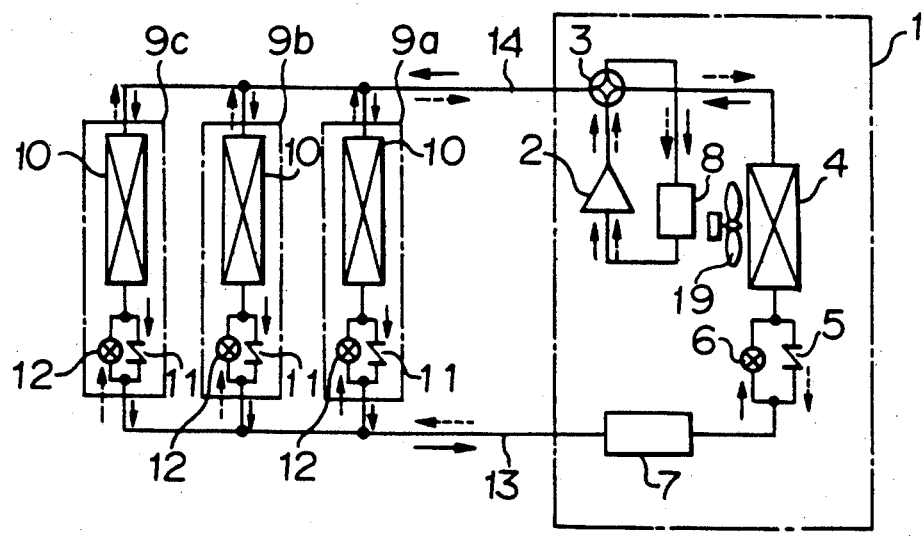
FIG. 37 is a schematic diagram showing the refrigerant system of a conventional air conditioning device.

A first embodiment of the present invention will be explained in reference to FIGS. 1 through 4. In these Figures, the same reference numerals and symbols as those in FIG. 37 showing the conventional air conditioning device indicate parts similar or corresponding to those of the conventional air conditioning device. Explanation on the parts which are indicated by such reference numerals or symbols will be omitted for the sake of clarity.

Explanation on the first embodiment will be made in reference to the case wherein a single outdoor unit is connected to three indoor units like the discussion on the conventional air conditioning device. The explanation on the first embodiment can be basically applicable to the case wherein a single outdoor unit is connected to two or more indoor units. Although the outdoor unit 1 of the air conditioning device is constituted by a compressor 2, a reversing valve 3, an outdoor heat exchanger 4 and an accumulator 8, only the compressor 2, the outdoor heat exchanger 4 and the reversing valve 3 are shown for the sake of clarity.

Reference numeral 20 designates a three port switching valve which can selectively connect one end of an indoor heat exchanger 10 to either a first connecting pipe 13 or a second connecting pipe 14. Reference numeral 21 designates a first electric expansion valve which is a first flow controller connected to the other end of the indoor heat exchanger 10. Indoor units 9a-9c are constituted by the three port switching valve 20, the indoor heat exchanger 10 and the first electric expansion valve 21, respectively. Reference numeral 22 designates a third connecting pipe which is connected to the first electric expansion valves 21 of the indoor units 9a-9c, and which is connected to the first connecting pipe 13 through a second electric expansion valve 23 which is arranged in the third connecting pipe and functions as a second flow controller.

The operation of the air conditioning device of the first embodiment having such structure will be explained.

Firstly, the case wherein only room heating is performed will be described with reference to FIG. 2. In this case, the flow of a refrigerant is indicated with arrows of solid line.

The gaseous refrigerant which has been discharged from the compressor 2 and has a high temperature and a high pressure is directed from outdoors toward indoors through the second connecting pipe 14. The refrigerant flows into the indoor heat exchangers 10 through the three port switching valves 20 of the indoor units 9a-9c. The refrigerant which has carried out heat exchanging (room heating) is condensed to be liquefied. The liquefied refrigerant from the indoor heat exchangers passes through the first electric expansion valves 21, flows into the third connecting pipe 22, and joins there. After that, the refrigerant passes through the second electric expansion valve 23. The refrigerant is depressurized by either the first electric expansion valves 21 or the second electric expansion valve 23 to take a two phase state having a low pressure. The refrigerant which has been thus depressurized to such low pressure flows into the outdoor heat exchanger 4 of the outdoor unit 1 through the first connecting pipe 13. In the outdoor heat exchanger, the refrigerant carries out heat exchanging to take a gaseous state, and the gaseous refrigerant is inspired into the compressor 2 again. In this way, the circulation cycle is formed to carry out room heating operation.

Secondly, the case wherein only room cooling is performed will be described in reference to FIG. 2. In this case, the flow of the refrigerant is indicated by arrows of broken line.

The gaseous refrigerant which has been discharged from the compressor 2 and has a high temperature and a high pressure carries out heat exchanging in the outdoor heat exchanger 4 and is condensed there to be liquefied. After that, the liquefied refrigerant passes through the first connecting pipe 13 and third connecting pipe 22 in this order, and then, the refrigerant flows into the indoor units 9a–9c. The refrigerant which has flowed into the indoor units 9a–9c is depressurized by the first electric expansion valves 21 to a low pressure. The refrigerant gas thus depressurized flows into the indoor heat exchangers 10, carries out heat exchanging with the air in the room with each indoor heat exchanger (room cooling) to be evaporated, thereby being gasified. The refrigerant which has been gasified is inspired into the compressor 1 through the three port switching valves 20 and the second connecting pipe 14. In this way, the circulation cycle is performed to carry out room cooling operation.

Figure 3:
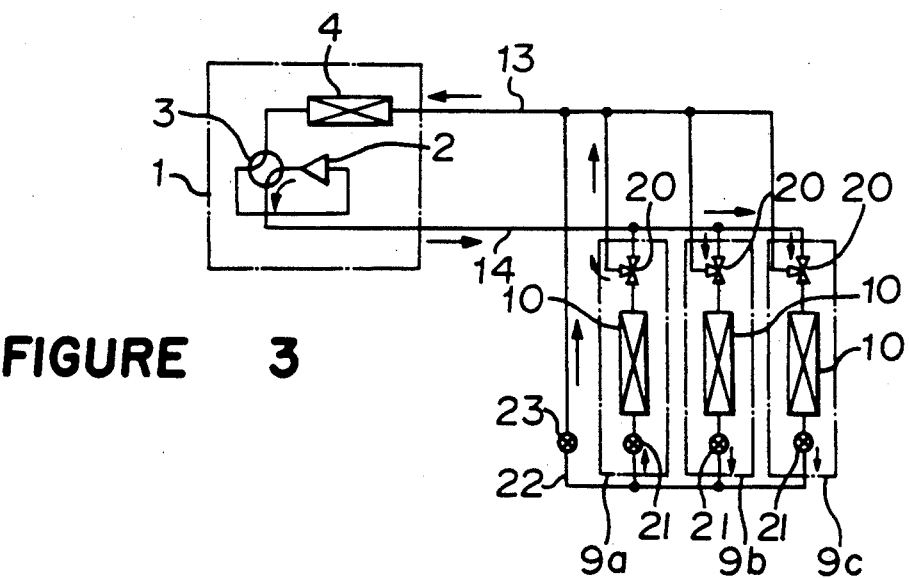
FIG. 3 is a schematic diagram showing the operation which is performed when room heat operation capacity is greater than room cooling operation capacity in the first embodiment of FIG. 1.

Thirdly, the case wherein room heating is principally performed in room cooling and room heating concurrent operation will be explained with reference to FIG. 3. In FIG. 3, arrows indicate the flow of the refrigerant.

The refrigerant which has been discharged from the compressor 2 passes through the second connecting pipe 14, and flows into the indoor units 9b, 9c for performing room heating, through their three port switching valves 20. In the indoor heat exchangers 10 of the room heating indoor units, the refrigerant carries out heat exchanging (room heating) to be condensed, thereby being liquefied. The refrigerant which has thus condensed and liquefied flows into the third connecting pipe 22 through the first electric expansion valves 21 of the room heating indoor units, the expansion valves being substantially fully opened. A part of the refrigerant which has flowed into the pipe 22 enters an indoor unit 9a for room cooling, is depressurized by the first expansion valve 21 of the room cooling unit. After that, the refrigerant thus depressurized flows into the indoor heat exchanger 10 of the room cooling indoor unit, carries out heat exchanging (room cooling), is evaporated to take a gaseous state, and flows into the first connecting pipe 13 through the three port switching valve 20 of the room cooling indoor unit.

On the other hand, the other part of the liquefied refrigerant is depressurized by the second electric expansion valve 23 to a low pressure. After that, the refrigerant flows from the third connecting pipe 22 into the first connecting pipe 13, and joins with the refrigerant from the room cooling indoor unit 9a. The refrigerant thus combined carries out heat exchanging in the outdoor heat exchanger 4 to be evaporated, thereby taking a gaseous state. Then, the gaseous refrigerant returns to the compressor 1 again. In this way, the circulation cycle is formed to carry out the room cooling and room heating concurrent operation wherein room heating is principally performed.

Figure 4:
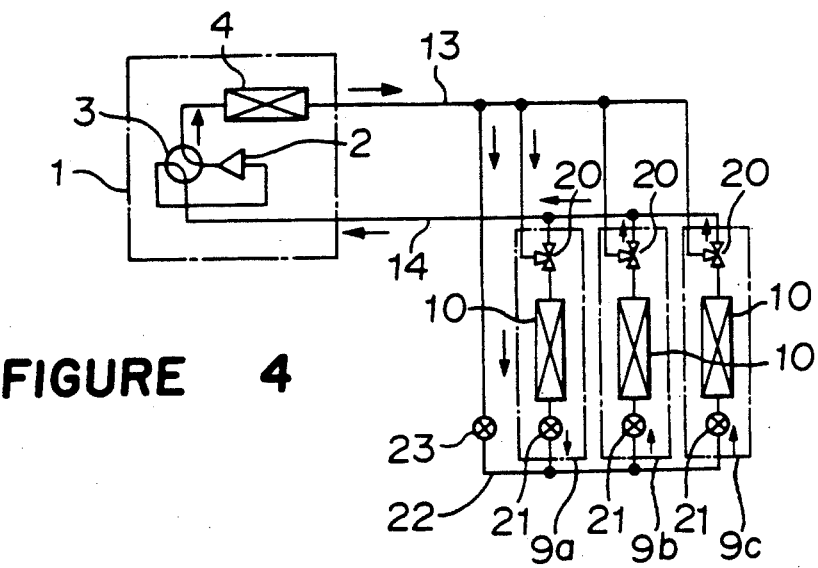
FIG. 4 is a schematic diagram showing the operation which is performed when room cooling operation capacity is greater than room heating operation capacity in the first embodiment of FIG. 1.

Fourthly, the case wherein room cooling is principally performed in the room cooling and room heating concurrent operation will be explained with reference to FIG. 4. As shown in FIG. 4, the refrigerant which has been discharged from the compressor 1 flows into the outdoor heat exchanger 4, carries out heat exchanging in an arbitrary amount to take a two phase state having a high temperature and a high pressure, and is fed from the first connecting pipe 13 toward indoors. A part of the refrigerant is introduced into the indoor heat exchanger 10 of an indoor unit 9a for room heating through its three port switching valve 20, carries out heat exchanging (room heating) to be condensed, thereby being liquefied. After that, the refrigerant flows into the third connecting pipe 22 through the first electric expansion valve 21 of the indoor unit 9a.

On the other hand, the other part of the refrigerant passes through the second electric expansion valve 23 (in a fully opened state) in the third connecting pipe 22, and joins with the refrigerant from the room heating indoor unit 9a. The refrigerant thus combined flows into indoor units 9b, 9c for room cooling from the third connecting pipe 22. The refrigerant is depressurized by the first electric expansion valves 21 of the indoor units 9b, 9c to a low pressure, and then enters the indoor heat exchangers 10 of the indoor units 9b, 9c where the refrigerant carries out heat exchanging (room cooling) to be evaporated. The refrigerant which has thus become gas flows into the second connecting pipe 14 through the three port switching valves 20, and returns to the compressor 2 again. In this way, the circulation cycle is formed to carry out the room cooling and room heating concurrent operation wherein room cooling is principally performed.

A second embodiment of the present invention will be described in reference to FIGS. 5 through 8. The second embodiment is shown to have a single outdoor unit connected to three indoor units like the first embodiment. In FIGS. 5 through 8, reference numerals 30a–30c designate indoor unit operation controllers, each of which outputs a signal to the corresponding first expansion valve 21 to adjust its opening degree, and each of which also outputs an indoor unit operation mode signal to a controller which will be described in detail below. Reference numerals 31 and 32 designate a thermal sensor comprising a thermistor and the like, and a pressure sensor comprising an electric pressure transducer and the like, both sensors being arranged in the third connecting pipe 22 between the first electric expansion valves 21 and the second electric expansion valve 23. Reference numeral 33 designates the controller which receives signals from the indoor unit operation controllers 30a–30c, the thermal sensor 31 and the pressure sensor 32, and which outputs a signal to the corresponding second electric expansion valve 23 to adjust its opening degree.

Figure 1:
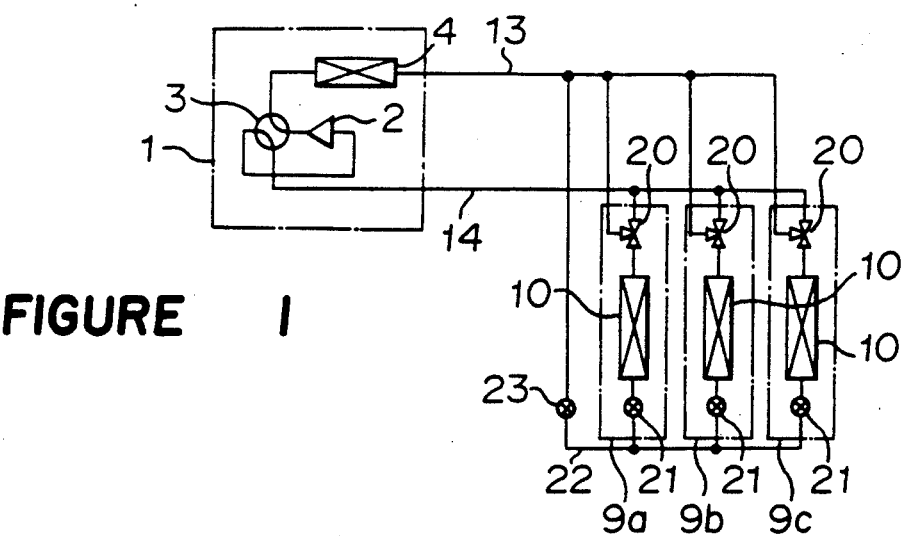
FIG. 1 is a schematic diagram showing the entire structure the refrigerant system of a first embodiment of the air conditioning device according to the present invention.
Figure 2:
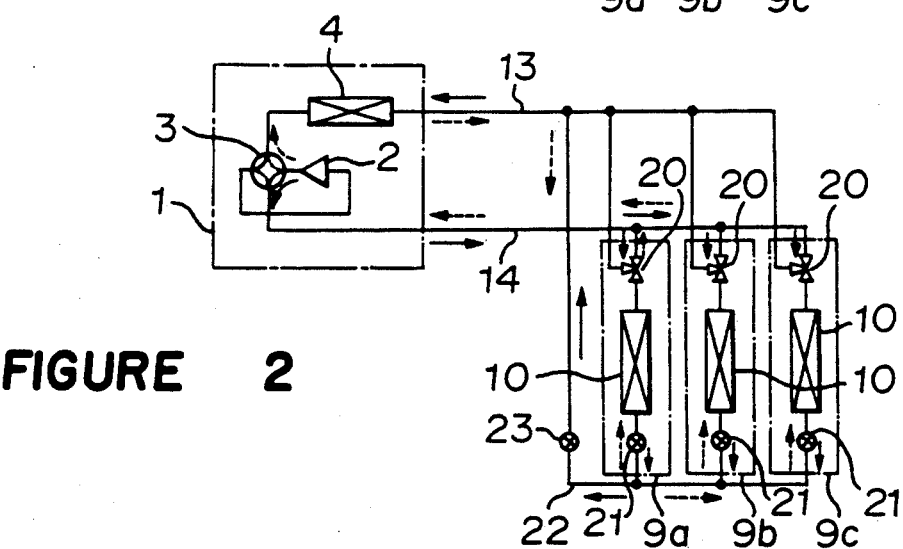
FIG. 2 is a schematic diagram showing the operation wherein either only room cooling or only room heating is carried out in the first embodiment of FIG. 1.
Figures 1, 9:
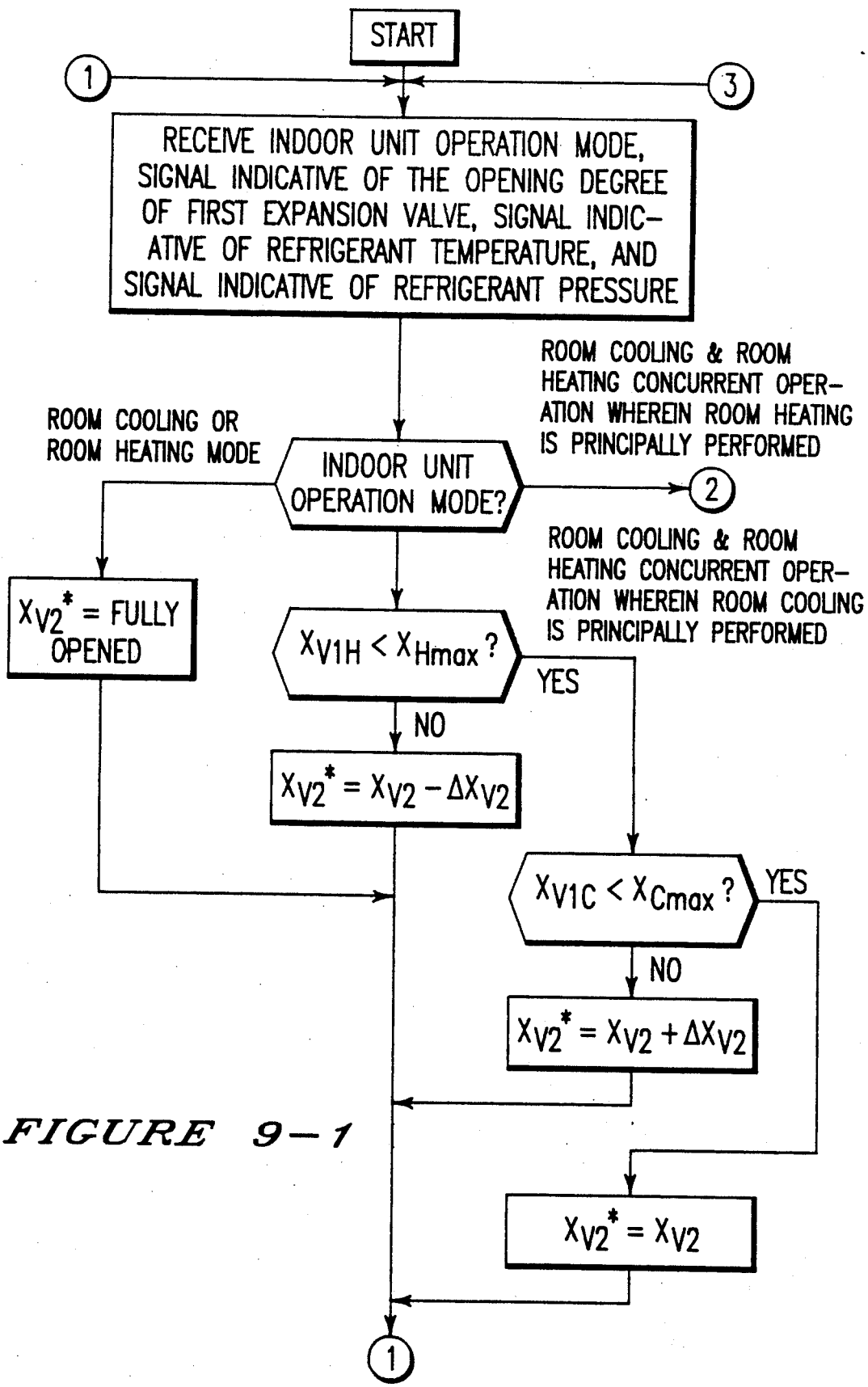
Figures 2, 9:
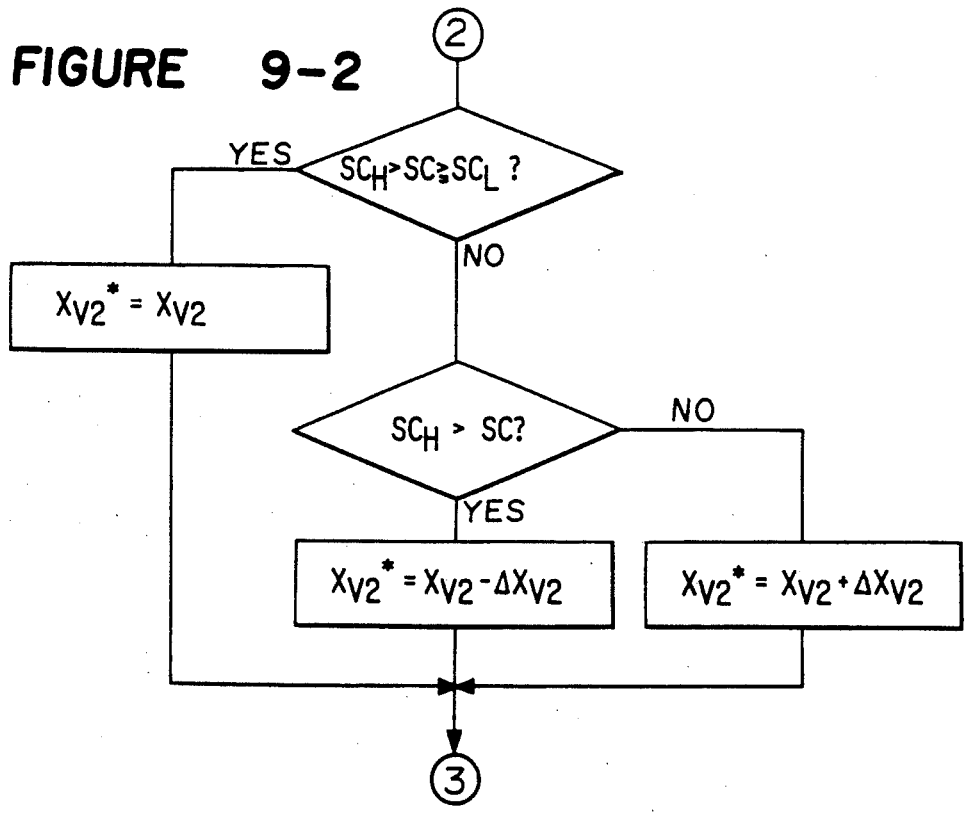

The second embodiment will be described in detail in reference to the flow charts of FIGS. 9-1 and 9-2 showing the flow control of the controller. In FIGS. 9-1 and 9-2, symbols $X_{V2}$ and $X_{V2}^*$ represent a present command value on the opening degree of the second electric expansion valve 23, and a new command value on that of the second electric expansion valve, respectively. Symbol $\Delta X_{V2}$ represents the variation between the present command value and the new command value. Symbols $X_{V1H}$ and $X_{V1C}$ represent the greatest value among the opening degrees of the first electric expansion valves 21 in room heating indoor units, and the greatest value among the opening degrees of the first electric expansion valves in room cooling indoor units. Symbols $X_{Hmax}$ and $X_{cmax}$ represent a controlled maximum opening degree of the first electric expansion valves in the room heating and room cooling indoor units, respectively. Symbols SC represents a subcooling degree of the refrigerant which is located in the portion of the third connecting pipe 22 where the thermal sensor 31 and the pressure sensor 32 are arranged. Symbols $SC_H$ and $SC_L$ represent the upper limit and the lower limit of a controlled subcooling degree.

Now, the operation of the air conditioning device according to the second embodiment will be explained. Firstly, the case wherein only room heating operation is performed will be described in reference to FIG. 6. The gaseous refrigerant which has been discharged from the compressor 2 and has a high temperature and a high pressure is directed from outdoors toward indoors through the second connecting pipe 14. The refrigerant flows into the indoor heat exchangers of the indoor units 9a-9c through their three port switching valves 20. The refrigerant carries out heat exchanging (room heating) in the indoor heat exchangers to be condensed, thereby being liquefied. The quantity of flow of the refrigerant which flows into the indoor units 9a-9c is controlled so that the first electric expansion valves 21 cause the refrigerant at the outlets of the indoor heat exchangers 10 to become slightly subcooled liquid. The refrigerant which has become such state of liquid is depressurized by the first electric expansion valves 21 to a low pressure, flows into the third connecting pipe 22 and joins there. On the other hand, the controller 33 receives an operation mode signal for each indoor unit through the indoor unit operation controllers 30a-30c. When the controller detects that all indoor units are under a room heating operation mode, the controller produces an output to the second electric expansion valve 23 so that the opening degree of the second electric expansion valve become full as shown in the control flow chart of FIG. 9-1. The refrigerant which has flowed into the third connecting pipe 22 passes through the second electric expansion valve 23, and enters the outdoor heat exchanger 4 of the outdoor unit 1 through the first connecting pipe 13. In the outdoor heat exchanger, the refrigerant carries out heat exchanging to become gas, and is inspired into the compressor 2 again. In this way, the circulation cycle informed to carry out room heating operation.

Figure 6:
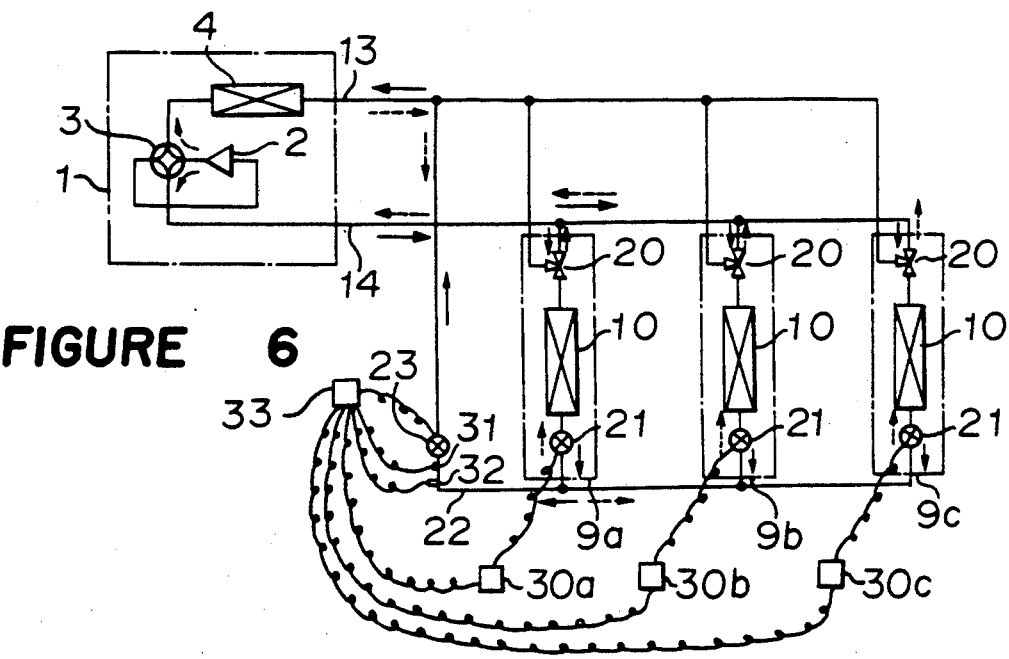
FIG. 6 is a schematic diagram showing the operation wherein either only room cooling or only room heating is carried out in the second embodiment of FIG. 5.
Figure 7:
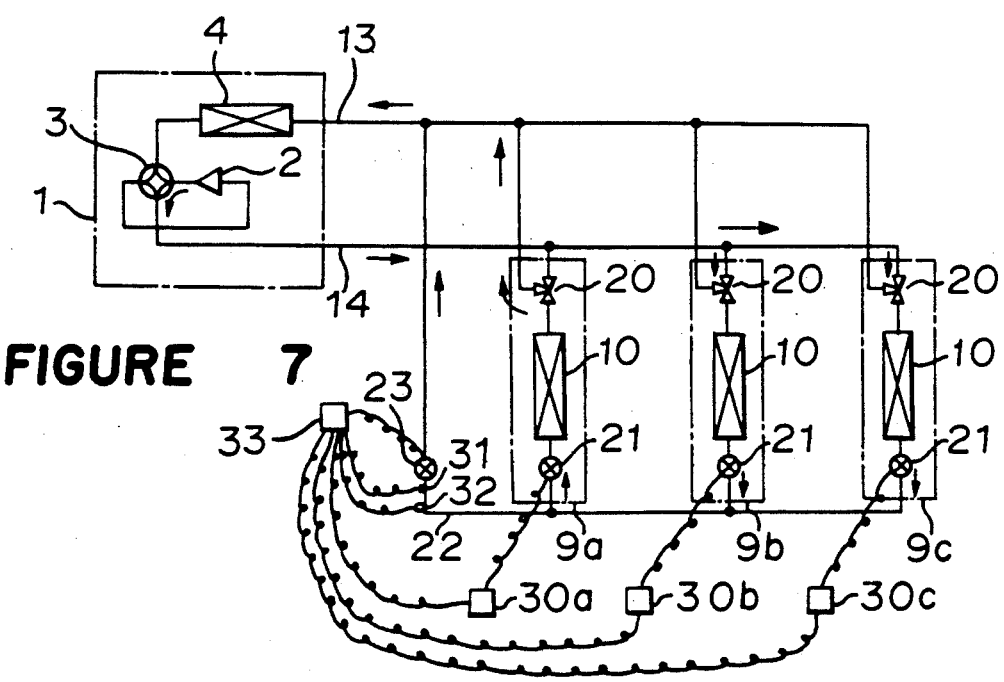
FIG. 7 is a schematic diagram showing the operation which is carried out when room heating operation capacity is greater than room cooling operation capacity in the second embodiment of FIG. 5.

Secondly, the case wherein only room cooling operation is performed will be explained in reference to FIG. 6 like the room heating operation only. The gaseous refrigerant which has been discharged from the compressor 2 and has a high temperature and a high pressure is condensed in the outdoor heat exchanger 4 to be liquefied. And then, the refrigerant passes through the first connecting pipe 13 and the third connecting pipe 22 in this order, and flows into the indoor units 9a-9c. At this time, the opening degree of the second electric expansion valve 23 which is arranged in the third connecting pipe 22 is full and the refrigerant can passes through the valve without being changed because when the controller 33 which receives the operation mode signal from each indoor unit detects that all indoor units 9a-9c are under a room cooling operation mode, the controller sends an output to the second electric expansion valve 23 so that its opening degree becomes full as shown in the control flow chart of FIG. 9-1. The refrigerant which has flowed into the indoor units 9a-9c is depressurized by the first electric expansion valves 21 to a low pressure, and enters the indoor heat exchangers 10. In the indoor heat exchangers, the refrigerant carries out heat exchanging with the air (room cooling) in each room with each indoor unit installed in to be evaporated, thereby being gasified. The refrigerant thus gasified flows into the second connecting pipe 14 through the three port switching valves 20, and is inspired into the compressor 2 again. In this way, the circulation cycle is formed to carry out room cooling operation.

Thirdly, the case wherein room heating is principally performed when the room cooling under room heating concurrent operation is carried out will be described in reference to FIGS. 7, 9-1 and 9-2.

The refrigerant which has been discharged from the compressor 2 flows through the second connecting pipe 14, and flows into room heating indoor units 9b and 9c through their three port switching valves 20. The refrigerant carries out heat exchanging (room heating) in the indoor heat exchangers 10 of the room heating indoor units to be condensed, thereby being liquefied. At this time, the quantity of flow of the refrigerant which flows into the indoor units 9b and 9c is controlled by the first electric expansion valves 21 so that the refrigerant at the outlets of the indoor heat exchangers 10 of the indoor units 9b and 9c becomes slightly subcooled liquid. The refrigerant thus condensed and liquefied is slightly depressurized by the first electric expansion valves 21 to have a medium pressure, and flows into the third connecting pipe 22. A part of the refrigerant which has flowed into the third connecting pipe 22 enters a room cooling indoor unit 9a, and is depressurized its first electric expansion valve 21 to a low pressure. After that, the refrigerant comes into the indoor heat exchanger 10 of the room cooling indoor unit 9a, and carries out heat exchanging (room cooling). The refrigerant is evaporated and becomes slightly superheated gas, and flows into the first connecting pipe 13 through the three port switching valve 20 of the indoor unit 9a. On the other hand, the other part of the refrigerant is depressurized by the second electric expansion valve 23 to a low pressure, and then, the refrigerant flows from the third connecting pipe 22 into the first connecting pipe 13. In the first connecting pipe, the refrigerant joins with the refrigerant from the room cooling indoor unit 9a, carries out heat exchanging in the outdoor heat exchanger 4 to take a gaseous state and is inspired into the compressor 2 again. In this way, the circulation cycle is formed to carry out the room cooling and room heating concurrent operation wherein room heating is principally performed.

The operation of the second electric expansion valve 21 under such operation will be described in detail with respect to FIGS. 9-1 and 9-2.

The controller 33 receives the operation mode signal from each indoor unit through the indoor unit operation controllers 30a-30c, and signals from the thermal sensor 31 and the pressure sensor 32 which are arranged in the third connecting pipe 22. When the controller detects based on input signals from the indoor unit operation controllers that room heating is principally performed under the room cooling and room heating concurrent operation, the controller calculates the subcooling degree SC of the refrigerant flowing through the third connecting pipe 22 with the thermal sensor 31 and the pressure sensor 32, based on signals from both sensors. In addition, the controller judges whether the calculated value SC is in the range of the controlled subcooling degree $SC_L$-$SC_H$ or not. When the value SC is in the range, the present command value $X_{n}$ of the opening degree to the second electric expansion valve 23 is output to the second electric expansion valve 23 as a new command value $X_{V2}^*$ without being modified. When the calculated value SC is out of the range of the controlled subcooling degree $SC_L$-$SC_H$, and when the value SC is greater than the upper limit $SC_H$ of the controlled subcooling degree, the opening degree which is obtained by adding the opening degree variation $\Delta X_{V2}$ to the present command value $X_{V2}$ of the opening degree is output to the second electric expansion valve 23 as a new opening degree command value $X_{V2}^*$. On the other hand, when the calculated value SC is out of the range of the controlled subcooling degree $SC_L$-$SC_H$, and when the value SC is smaller than the lower limit $SC_L$ of the controlled subcooling value, the opening degree which is obtained by subtracting $\Delta X_{V2}$ from $X_{V2}$ is output to the second electric expansion valve 23 as a new opening degree command value $X_{V2}^*$. In this way, the opening degree of the second electric expansion valve 23 is adjusted to keep in an predetermined range the subcooling degree of the refrigerant which is located at the portion with the thermal sensor 31 and the pressure sensor 32 in the third connecting pipe 22. The controlled subcooling degree for the second expansion valve is set so as to be slightly smaller than the controlled subcooling degree for the first electric expansion valves 21 corresponding to the room heating indoor units 9b and 9c.

Figure 8:
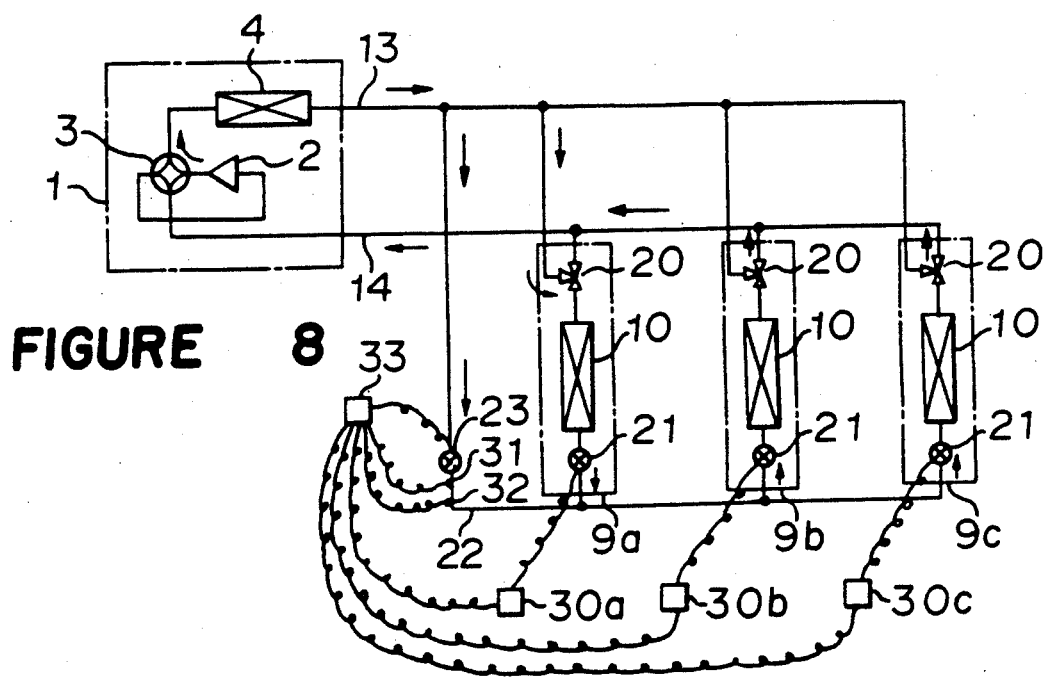
FIG. 8 is a schematic diagram showing the operation which is carried out when room cooling operation capacity is greater than room heating operation capacity in the second embodiment of FIG. 5.

Fourthly, the case wherein room cooling is principally performed under the room cooling and room heating concurrent operation is made as follows: As shown in FIG. 8, the refrigerant which has been discharged from the compressor 2 flows into the outdoor heat exchanger 4, carries out heat exchanging in an arbitrary amount to take a two phase state having a high temperature and a high pressure, and is fed toward indoors through the first connecting pipe 13. A part of the refrigerant is introduced into the indoor heat exchanger 10 of a room heating indoor unit 9a through its three port switching valve 20, is carried out heat exchanging (room heating) to be condensed, thereby liquefied. The refrigerant is depressurized by the first electric expansion valve 21 of the indoor unit 9a to a medium pressure, and then the refrigerant is flowed into the third connecting pipe 22. At this time, the quantity of flow of the refrigerant which flows into the room heating indoor unit 9a is controlled by adjusting the opening degree of the first electric expansion valve 21 of the room heating indoor unit so that the refrigerant at the outlet of the indoor heat exchanger becomes slightly subcooling liquid.

On the other hand, the other portion of the refrigerant flows through the third connecting pipe 22 at a rate of regulated by the second electric expansion valve 23 and is depressurized by the valve to a medium pressure. After that, that portion of the refrigerant joins with the portion of the refrigerant from the room heating indoor unit 9a. The refrigerant thus combined flows from the third connecting pipe 22 into indoor units 9b and 9c for room cooling, and is depressurized to a low pressure by the first electric expansion valves 21 of the room cooling indoor units. And, the refrigerant enters the indoor heat exchangers 10 where the refrigerant carries out heat exchanging (room cooling) and is evaporated. At this time, the quantity of flow of the refrigerant that flows into the room cooling indoor units 9b and 9c is controlled by adjusting the opening degree of the first electric expansion valves 21 so that the refrigerant at the outlets of the indoor heat exchangers becomes slightly superheated gas. The refrigerant which has evaporated in the room cooling indoor units 9b and 9c and become gas flows into the second connecting pipe 14 through the three port switching valves 20 of the indoor units 9b and 9c, and is inspired into the compressor 2 again. In this way, the circulation cycle is formed to carry out the room cooling and room heating concurrent operation wherein room cooling is principally performed.

The operation of the second electric expansion valve 23 under such operation will be explained in detail with reference to FIG. 9-1 like that under the concurrent operation wherein room heating is principally performed.

Firstly, controlling the second electric expansion valve 23 will be summarized. In the refrigerant circuit which is taken under the room cooling and room heating concurrent operation with room heating being principally performed, the first electric expansion valve 21 of the room heating indoor unit 9a, and the first electric expansion valves 21 of the room cooling indoor units 9b and 9c are connected in series in reference to the flow of the refrigerant. As a result, in order to obtain a required quantity of flow of the refrigerant, it is necessary that the pressure of the refrigerant is at a medium level at the outlet of the first electric expansion valve 10 of the room heating indoor unit 9a and at the inlets of the first electric expansion valves 21 of the room cooling indoor units 9b and 9c to ensure a pressure difference before and after the first electric expansion valves 21 of the room cooling indoor units. The function of the second electric expansion valve 23 is to control the medium pressure. The quantity of flow of the refrigerant which bypasses the room heating indoor unit 9a is regulated by the second electric expansion valve 23 under the control of controller 33 to control the medium pressure so that the first electric expansion valves 21 of the room heating indoor unit 9a and the room cooling indoor units 9b, 9c can obtain a required quantity of flow of the refrigerant at an opening degree in a predetermined range. The controller 33 receives indoor unit operation mode signals from the indoor unit operation controllers 30a-30c, and signals indicative of the opening degrees of the first electric expansion valves 21 ($x_{1H}$ for the room heating unit, $X_{V1C}$ for the room cooling units). When the controller 33 detects based on the received signals that room cooling is principally performed under the room cooling and room heating concurrent operation, the controller compares $X_{V1H}$, the signal indicative of the opening degree of the first electric expansion valve 21 of the room heating unit 9a, with $X_{Hmax}$, the controlled maximum opening degree on room heating. When the inequality, $X_{V1H} > X_{Hmax}$, is satisfied, the controller outputs to the second electric expansion valve 23 a new opening degree command value, $X_{V2}^*$ which is obtained by subtracting the opening degree variation, $\Delta X_{V2}$, from the present opening degree command value, $X_{V2}$.

When the inequality, $X_{V1H} < X_{Hmax}$, is satisfied, the controller compares $X_{V1C}$, the greatest value among the opening degrees of the first electric expansion valves 23 of the room cooling units 9b, 9c, with $X_{Cmax}$, the controlled maximum opening degree on room cooling.

When the inequality, $X_{V1C} > X_{Cmax}$, is satisfied, the cotroller outputs to the second electric expansion valve 23 a new opening degree command value $X_{V2}^*$ which is obtained by adding $\Delta X_{V2}$ to the present opening degree command value $X_{V2}$.

When the inequality, $X_{V1C} < X_{Cmax}$, is satisfied, the controller outputs to the second electric expansion valve 23 the present opening degree command value $X_{V2}$ as a new opening degree command value $X_{V2}^*$.

The second embodiment can provide an air conditioning device wherein the quantity of flow of the refrigerant is controlled at the optimum state under the room cooling and room heating concurrent operation to carry out an effective operation.

Although the air conditioning device of the second embodiment is constructed to receive signals indicative of the indoor unit operation modes and of the opening degrees of the first electric expansion valves 23 from the indoor unit operation controllers 30a-30c, a refrigerant temperature signal from the thermal sensor 31, and a pressure signal from the pressure sensor 32, the air conditioning device is not limited to such structure. Such signals can be input in a different manner. The explanation on the second embodiment has been made in reference to the case wherein the plural indoor units have the same volume. When the indoor units have different volumes, signals indicative of the volumes of the indoor units can be input to the controller 33 to detect the total volume of the room cooling and room heating operation by the indoor units, thereby detecting the operation modes, or signals indicative of the operation modes of the outdoor unit can be input to the controller to detect the operation modes. In this way, the operation modes can be correctly detected to carry out the optimum control.

Figure 10:
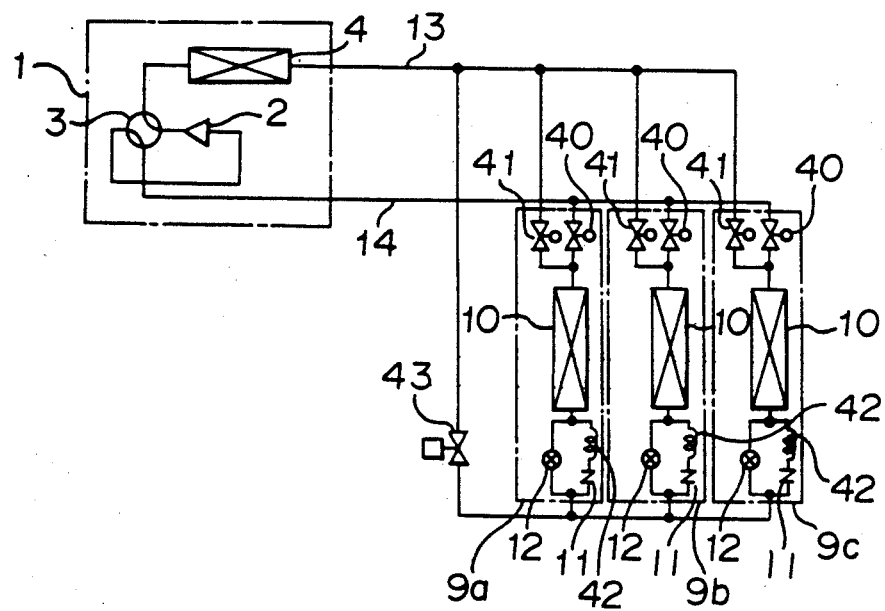
FIG. 10 is a schematic diagram showing the entire structure of the refrigerant system of the air conditioning device of a third embodiment.
Figure 11:
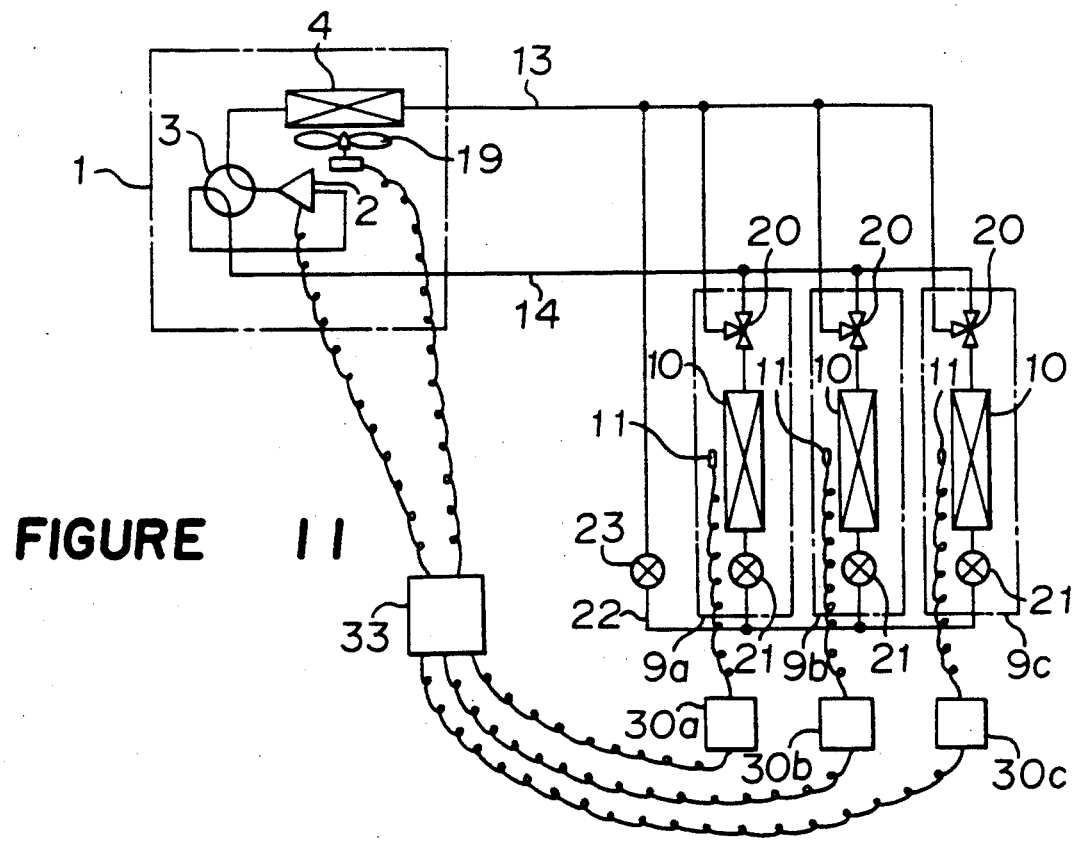
FIG. 11 is a schematic diagram showing the entire structure of the refrigerant system of the air conditioning device of a fourth embodiment.

In the first and second embodiments, the three port switching valves 20 are arranged to make a selective connection to the first connecting pipe 13 and to the second connecting pipe 14. As shown in FIG. 10 which is a schematic diagram showing the refrigerant system in the air conditioning device of a third embodiment, two switching valves such as solenoid valves 40, 41 and the like in place of the three port switching valve 20 can be arranged in each of the indoor units so as to do a selective connection. The explanation on the first and second embodiments has been made with respect to the case wherein the indoor units 9a-9c are provided with the first electric expansion valves 21, respectively. In place of the first electric expansion valve 21, a parallel connection of a temperature-operated expansion valve 12 and a series connection of a capillary tube 42 and a check valve 11 can be arranged so that when the relative indoor unit is on cooling, the refrigerant is depressurized to a low pressure by the temperature-operated expansion valve 12, and when the relative indoor unit is on heating, the refrigerant flows from the relative indoor heat exchanger 10 into the third connecting pipe 22 through the capillary tube 42 and the check valve 11. Although the third connecting pipe 22 is provided with the second electric expansion valve 23 in the first and second embodiments, the second electric expansion valve can be replaced by e.g. a switching valve of an electric flow control valve (ball valve etc.) 43 as shown in FIG. 10.

Although the indoor units 9a-9c are constituted by the three port switching valves 20, the indoor heat exchangers 10, and the first electric expansion valves 21 in the first and second embodiments, each indoor unit 9a, 9b or 9c is constituted by either only the indoor heat exchanger 10, or the combination of the indoor heat exchanger 10 and the three port switching valve 20 or the first electric expansion valve 21 so that the three port switching valve 20 and the first electric expansion valve 21 can be controlled depending on the air conditions of the indoor unit. In addition, the embodiments as stated earlier are explained in reference to the case wherein the outdoor heat exchanger 4 and the indoor heat exchangers 10 carry out heat exchanging between air and the refrigerant. Either the outdoor heat exchanger or the indoor heat exchangers, or both outdoor and indoor heat exchangers can carry out heat exchanging using water and the refrigerant.

A fourth embodiment of the present invention will be described in reference to FIGS. 11 through 15-1.

The fourth embodiment is different from the second embodiment in that the compressor 2 of the outdoor unit 1 is a variable rotational frequency type compressor as a volume control type of compressor such as an inverter, and that the outdoor unit includes an outdoor fan as a heat exchanging amount changing means for the outdoor heat exchanger 4.

The indoor unit operation controllers 30a-30c of the fourth embodiment are so constructed that they output to the controller 33 as described in detail later the operation modes of the indoor units, and the difference between a set temperature and an actual room temperature concerning each indoor unit (the difference between a set temperature and the temperature of inspired air in this embodiment because the temperature of the inspired air is treated as actual room temperatures). The indoor units 9a-9c are provided with thermal sensors 11 such as thermistors, respectively, for detecting the temperature of the inspired air in each indoor unit. Each indoor unit operation controller 30a, 30b or 30c outputs the operation mode and the rated capacity of each indoor unit 9a, 9b or 9c, and the temperature difference between a set temperature and inspired air temperature detected by each indoor unit, to the controller 33, which in turn outputs a signal for controlling the rotational frequency of the compressor 2 and the revolution of the outdoor fan 19. In the fourth embodiment, the rotational frequency of the compressor 2 is adjusted to control the volume of the compressor 2, and the revolution of the outdoor fan 19 is adjusted to control heat exchanging amount.

Figure 5:
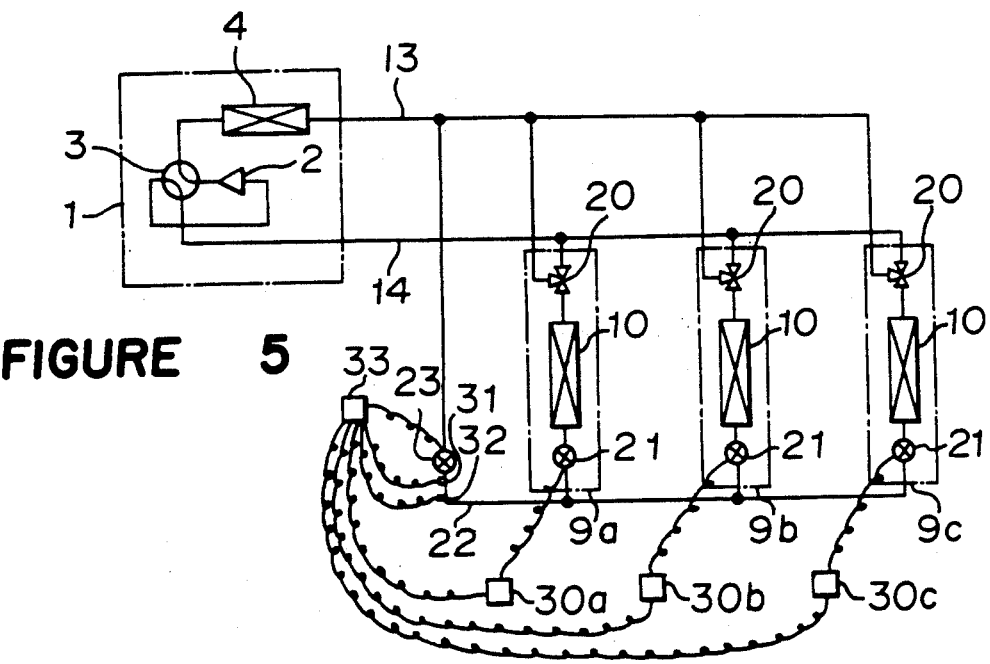
FIG. 5 is a schematic diagram showing the entire structure of the refrigerant system of a second embodiment of the air conditioning device according to the present invention.
Figures 1, 15:
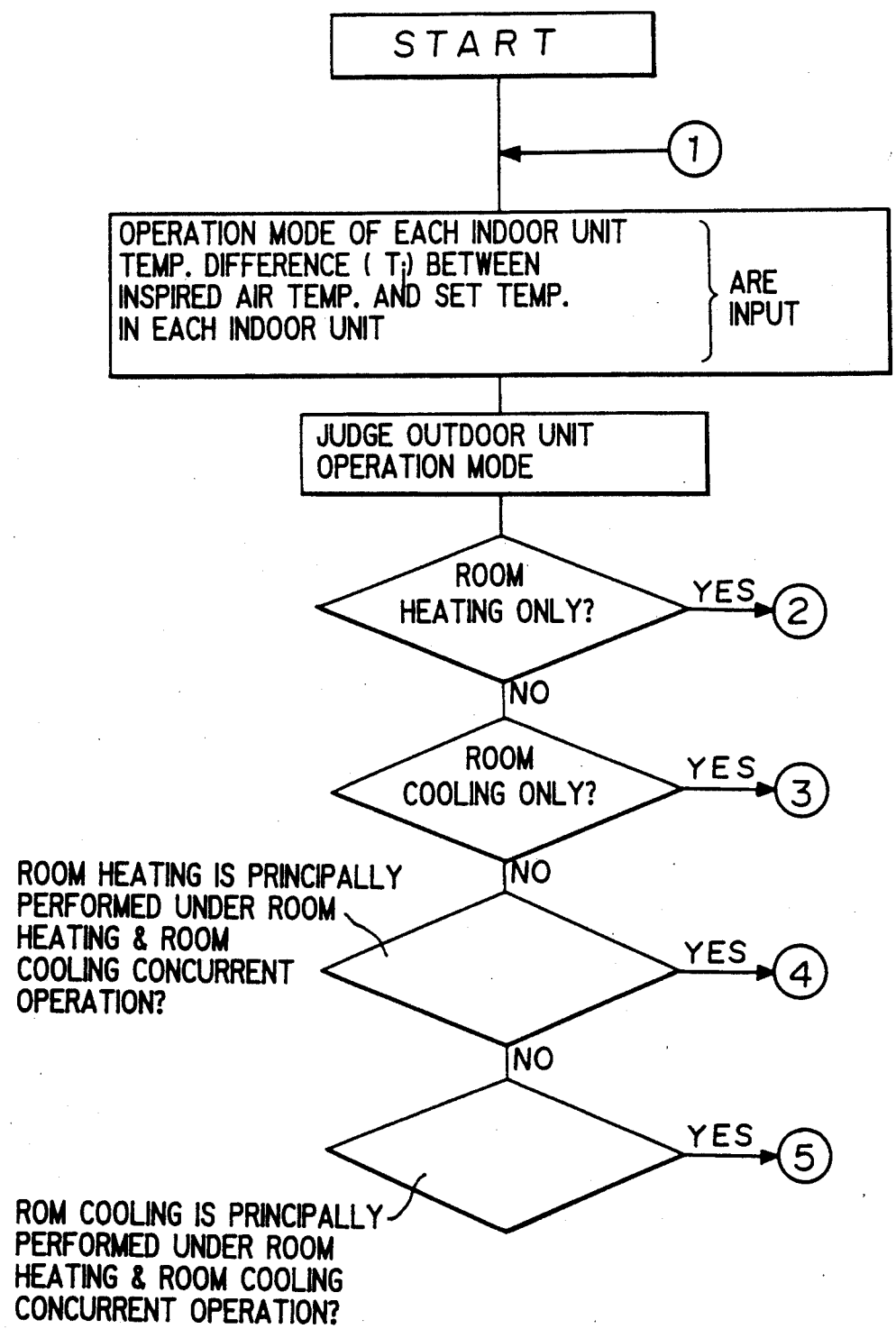
Figures 2, 15:
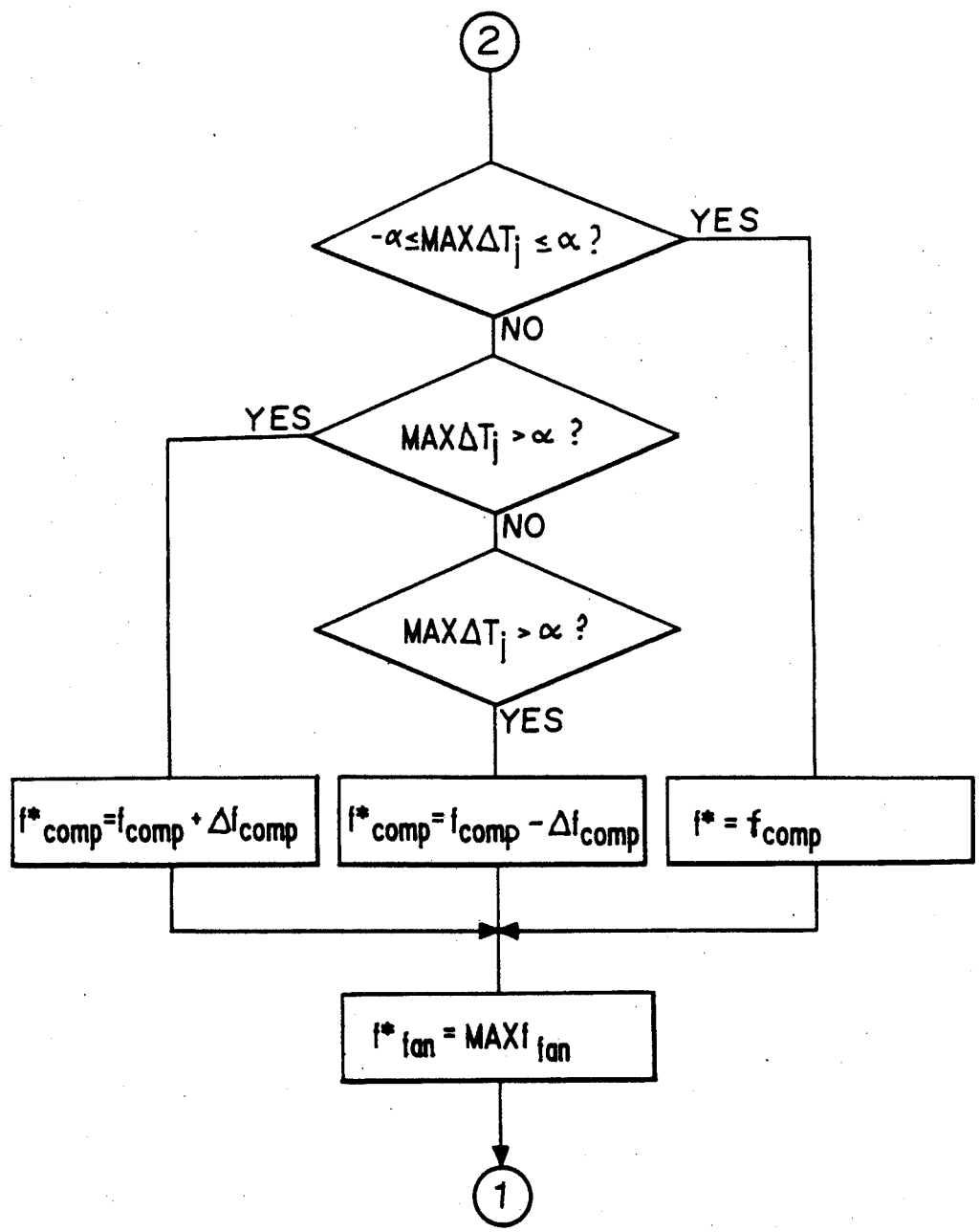
Figures 3, 15:
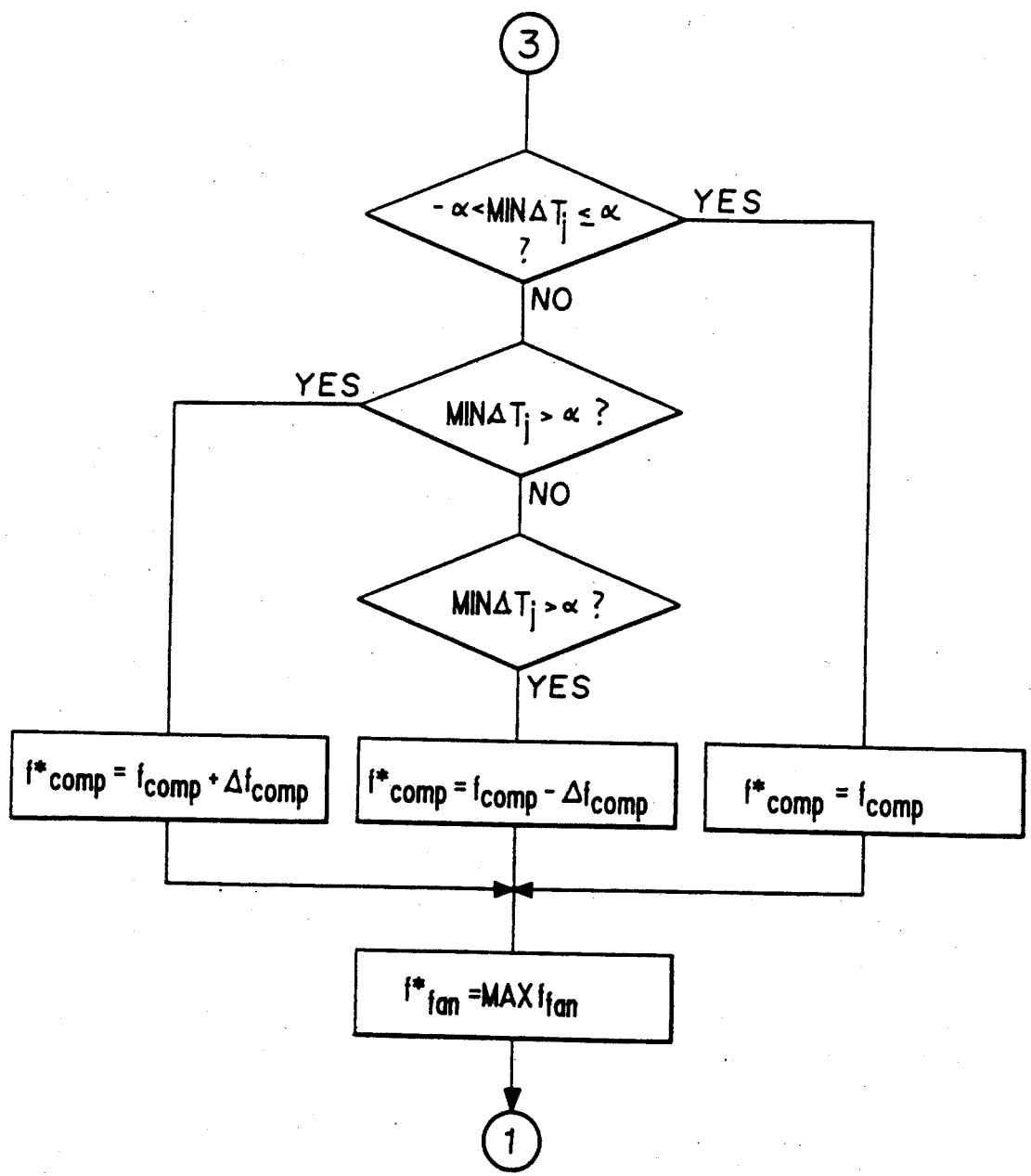
Figures 4, 15:
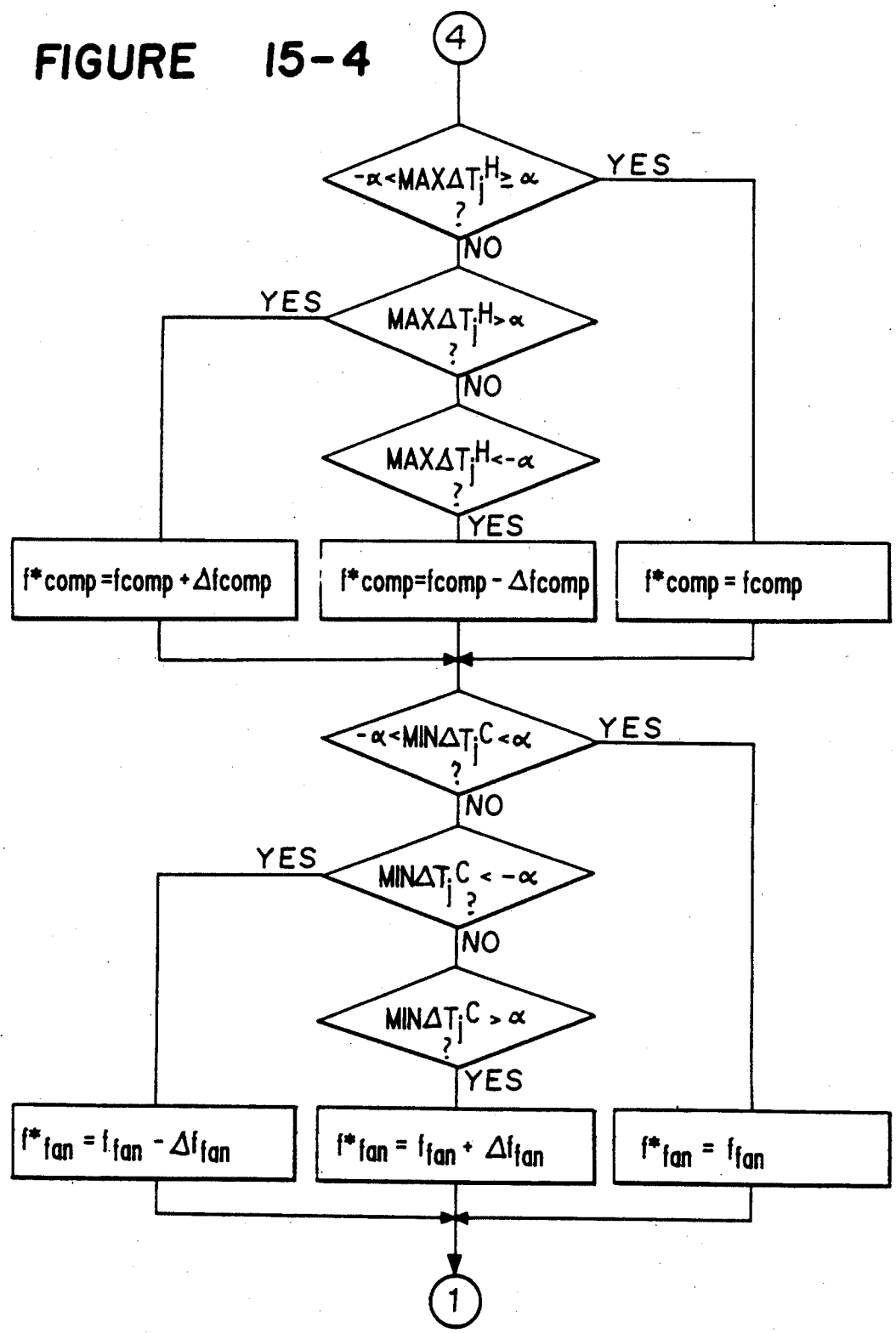
Figures 5, 15:
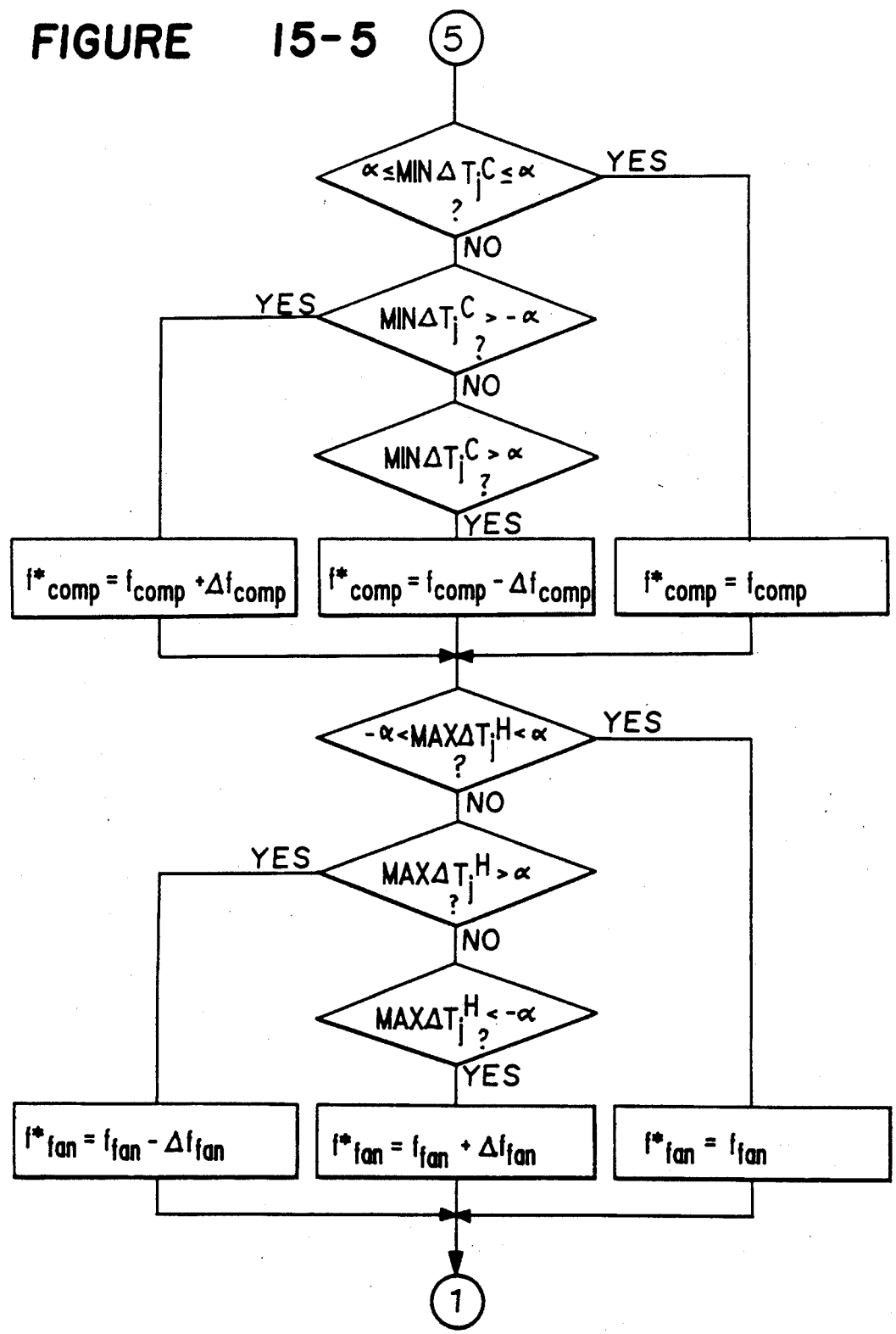

In FIGS. 15-1 through 15-5, symbol $\Delta T_j$ represents the temperature difference $(\Delta T_j = T_{setj} - T_{Rj})$ between the set temperature $(T_{setj})$ and the inspired air temperature $T_{Rj}$ in a "j"th indoor unit.

Symbols, MAX$\Delta T_j$ and MIN$\Delta T_j$ represent the greatest value and the smallest value, respectively, among the values of the temperature differences, $\Delta T_j$, in all indoor units. Symbol, MAX$\Delta T_j^H$ represents the greatest value among $\Delta T_j$ of room heating indoor units under room cooling and room heating concurrent operation. Symbol, MIN$\Delta T_j^C$ represents the smallest value among $\Delta T_j$ of room cooling indoor units under room cooling and room heating concurrent operation. Symbol, $\alpha$, represents a control target range for $\Delta T_j$, $+\alpha$ representing the upper limit, and $-\alpha$ representing the lower limit.

In addition, symbols, $f_{comp}$ and $f_{comp}^*$ represent the present command value and a new command value, respectively, with respect to the rotational frequency of the compressor 2, $\Delta f_{comp}$ representing a variation between the present command value and the new command value. Symbols, $f_{fan}$ and $f^*_{fan}$, represent the present command value and a new command value, respectively, with respect to the revolution of the outdoor fan 19, $\Delta f_{fan}$ representing a variation between the present command value and the new command value. Symbol, MAX$f_{fan}$ represents the maximum revolution of the outdoor fan 19.

The operation of the air conditioning device which is constructed in accordance with the fourth embodiment will be explained.

Figure 12:
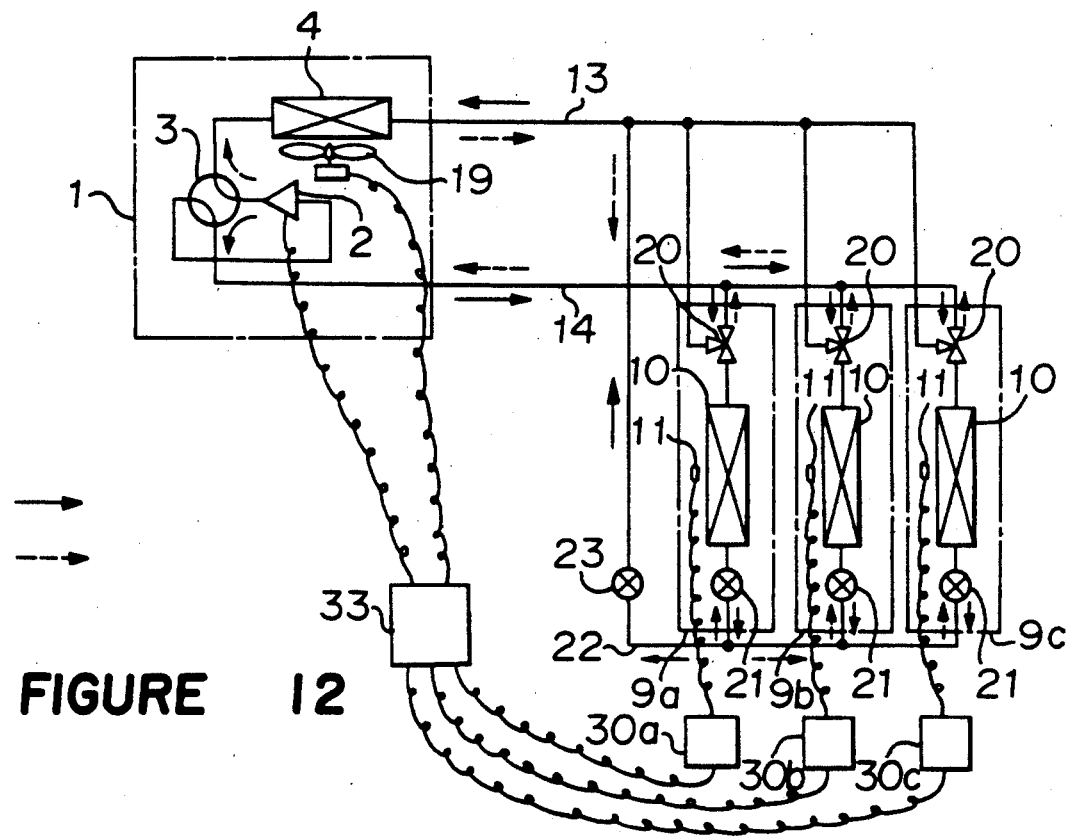
FIG. 12 is a schematic diagram showing the operation wherein either only room cooling or only room heating is performed in the fourth embodiment of FIG. 11.
Figure 13:
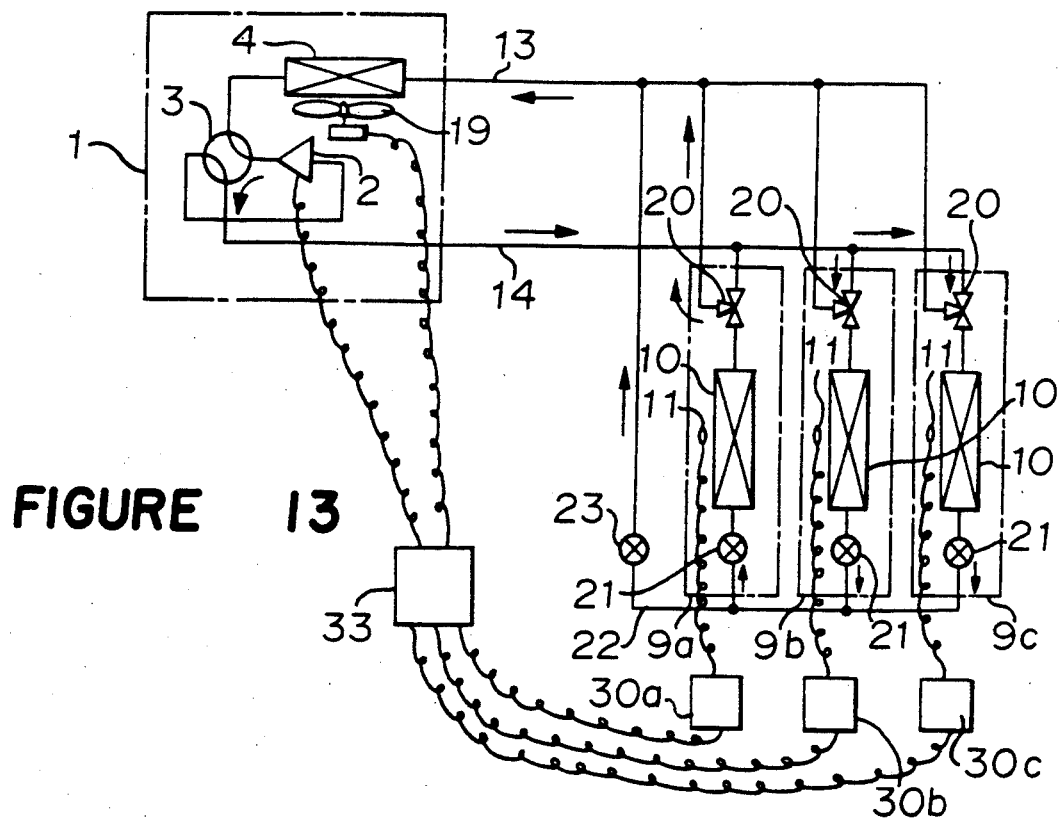
FIG. 13 is a schematic diagram showing the operation which is carried out when room heating operation is principally performed in the fourth embodiment of FIG. 11.

With regard to the flow of the refrigerant on room heating operation only, the flow of refrigerant is the same as that of the second embodiment as indicated in arrows of solid lines in FIG. 12, and explanation on the flow of the refrigerant will be omitted.

Now, the control method on the rotational frequency of the compressor 2 and the revolution of the outdoor fan 19 on room heating only will be described with reference to FIGS. 15-1 and 15-2.

Firstly, the controller 33 receives the operation mode from each indoor unit through the indoor unit operation controllers 30a–30c. When all indoor units are on room heating, the controller 33 judges that it is now under room heating operation mode, and controls the compressor and the outdoor fan according to the control flow chart of FIG. 15-2. Specifically, the controller 33 seeks the greatest value among $\Delta T_j$ of the room heating indoor units. When the greatest value is in a predetermined control target range, the controller 33 outputs the present command value $f_{comp}$ of the rotational frequency of the compressor 2 as a new command value $f^*_{comp}$ to the compressor 2.

When the greatest value among $\Delta T_j$ of the room heating indoor units is greater than the upper limit $(+\alpha)$ of the control target range, the controller 33 judges that there is a unit short of capacity among the indoor units, and outputs to the compressor 2 as a new command value $f^*_{comp}$ a value which is obtained by adding $\Delta f_{comp}$ to the present command value $f_{comp}$ for the rotation frequency of the compressor 2.

When the greatest value among $\Delta T_j$ of the room heating indoor units is smaller than the lower limit $(-\alpha)$ of the control target range, the controller 33 judges that the capacity of each indoor unit is excessive, and outputs to the compressor 2 as a new command value $f^*_{comp}$ a value which is obtained by subtracting $\Delta f_{comp}$ from the present command value $f_{comp}$ for the rotational frequency of the compressor 2.

The outdoor fan 19 is controlled to rotate at the maximum revolution on room heating only.

Secondly, the operation on room cooling only will be explained.

The flow of the refrigerant on room cooling operation only is the same as that of the second embodiment as indicated by arrows of broken line in FIG. 12.

The control method on the rotational frequency of the compressor 2 and the revolution of the outdoor fan 19 will be explained with reference to FIGS. 15-1 and 15-3.

Firstly, the controller 33 receives the operation mode of each indoor unit through the indoor unit operation controllers 30a–30c. When all indoor units are on room cooling, the controller 33 judges that it is now under room cooling operation mode, and controls the compressor and the outdoor fan according to the control flow chart of FIG. 15-3. Specifically, the controller 33 seeks the smallest value among $\Delta T_j$ of room cooling indoor units. When the greatest value is in a predetermined control target range, the controller 33 outputs the present command value $f_{comp}$ of the rotational frequency of the compressor 2 as a new command value $f^*_{comp}$ to the compressor 2.

When the smallest value among $\Delta T_j$ of room cooling units is smaller than the lower limit $(-\alpha)$ of the control target range, the controller judges that there is an indoor unit short of capacity, and outputs to the compressor 2 as a new command value $f^*_{comp}$ a value which is obtained by adding $\Delta f_{comp}$ to the present command value $f_{comp}$ of the rotational frequency of the compressor 2.

When the greatest value of $\Delta T_j$ of the room cooling units is greater than the upper limit $(\alpha)$ of the control target range, the controller 33 judges that the capacity of all indoor unit is excessive, and outputs to the compressor 2 as a new command value $f^*_{comp}$ a value which is obtained by subtracting $\Delta f_{comp}$ from the present command value $f_{comp}$ of the rotational frequency of the compressor 2.

The outdoor fan 19 is controlled to rotate at the maximum revolution on room cooling only.

Thirdly, the case wherein room heating is principally performed under room cooling and room heating concurrent operation will be explained.

The flow of the refrigerant in this case is the same as that of the second embodiment (see FIG. 7) as indicated by arrows of broken line in FIG. 12.

The control method on the rotational frequency of the compressor 2 and the revolution of the outdoor fan 19 will be explained with reference to FIGS. 15-1 and 15-4.

The controller 33 receives the operation mode of each indoor unit through the indoor unit operation controllers 30a–30c. When the controller 33 detects the concurrence of a room heating indoor unit and a room cooling indoor unit, the controller compares the total capacity required for room heating with the total capacity required for room cooling based on the number of room heating indoor units and the number of the room cooling indoor units. When the total capacity required for room heating is greater than that required for room cooling, the controller 33 judges that it is now under the operation mode wherein room heating is principally performed. In accordance with the control flow chart of FIG. 15-4, the controller 33 controls the rotational frequency of the compressor 2 so that the capacity of the room heating indoor units reaches a predetermined value, and controls the revolution of the outdoor fan 19 so that the capacity of the room cooling indoor units reaches a predetermined value. In detail, firstly, the controller 33 seeks the greatest value $(MAX\Delta T_j^H)$ among $\Delta T_j$ of room heating indoor units. When the greatest value is in a predetermined control target range, the controller 33 outputs to the compressor 2 the present command value $f_{comp}$ of the rotational frequency of the compressor 2 as a new command value $f^*_{comp}$.

When the greatest value $(MAX\Delta T_j^H)$ among $\Delta T_j$ of the room heating indoor units is greater than the upper limit $(+\alpha)$ of the control target range, the controller 33 judges that there is a indoor unit short of capacity among the room heating indoor units, and outputs to the compressor 2 as a new command value $f^*_{comp}$ a value of which is obtained by adding $\Delta f_{comp}$ to the present command value $f_{comp}$ of the rotational frequency of the compressor 2.

When the greatest value $(MAX\Delta T_j^H)$ among $\Delta T_j$ of the room heating indoor units is smaller than the lower limit $(-\alpha)$ of the control target range, the controller 33 judges that the capacity of all room heating indoor units is excessive, and outputs to the compressor 2 as a new command value $f^*_{comp}$ a value which is obtained by subtracting $\Delta f_{comp}$ from the present command value $f_{comp}$ of the rotational frequency of the compressor 2.

On the other hand, the revolution of the outdoor fan 19 is controlled based on the smallest value (MIN$\Delta T_j^C$) among $\Delta T_j$ of room cooling indoor units. Specifically, when the smallest value (MIN$\Delta T_j^C$) among $\Delta T_j$ of the room cooling indoor units is in a predetermined control target range, the controller 33 outputs to the outdoor fan 19 the present command value $f_{fan}$ of the revolution of the outdoor fan 19 as a new command value $f^*_{fan}$.

When the smallest value (MIN$\Delta T_j^C$) among $\Delta T^j$ of the room cooling indoor units is smaller than lower limit ($-\alpha$) of the control target range, the controller judges that there is a unit short of capacity among the room cooling indoor units, and outputs to the outdoor fan 19 as a new command value $f^*_{fan}$ a value which is obtained by adding $\Delta f_{fan}$ to the present command value $f_{fan}$ of the revolution of the outdoor fan 19.

When the smallest value (MIN$\Delta T_j^C$) among $\Delta T_j$ of the room cooling indoor units is greater than the upper limit ($+\alpha$) of the control target range, the controller 33 judges that the capacity of all room cooling indoor units is excessive, and outputs to the outdoor fan 19 as a new command value $f^*_{fan}$ a value which is obtained by subtracting $\Delta f_{fan}$ from the present command value $f_{fan}$ of the revolution of the outdoor fan 19.

Now, the case wherein room cooling is principally performed at under room cooling and room heating concurrent operation will be explained.

Figure 14:
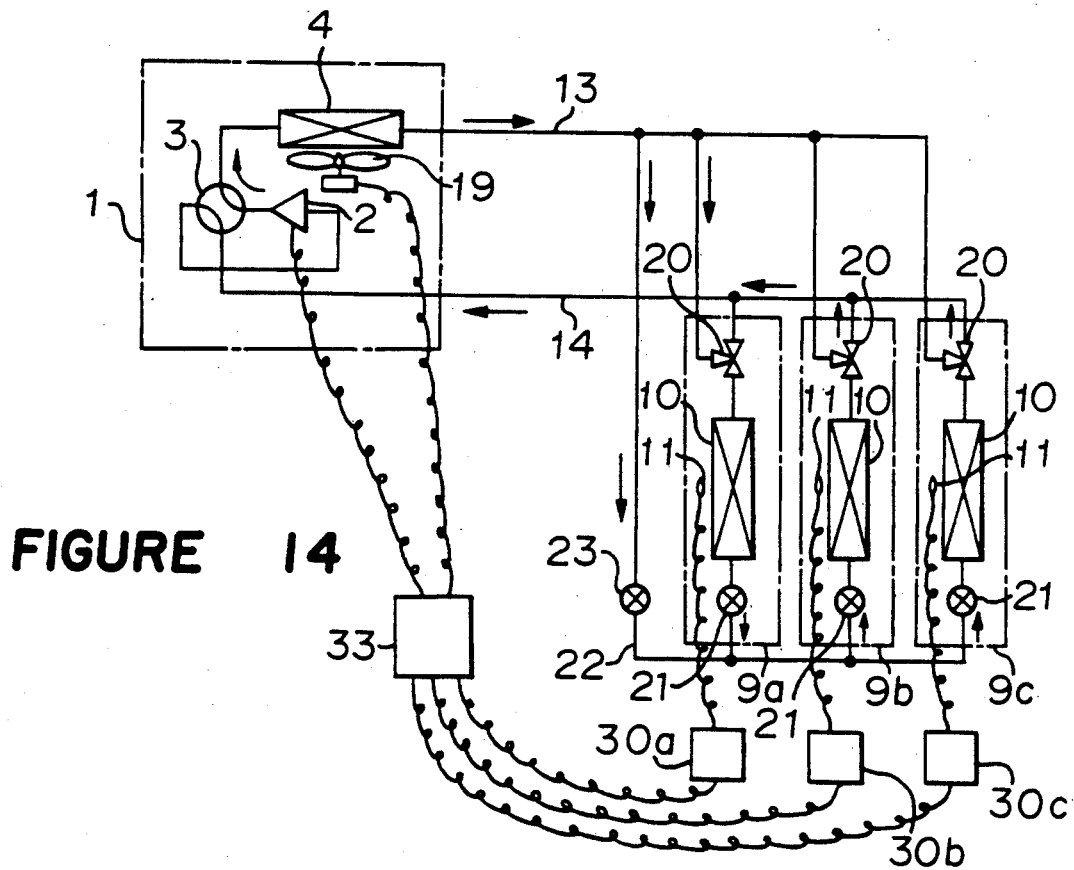
FIG. 14 is a schematic diagram showing the operation which is carried out when room cooling operation is principally performed in the fourth embodiment of FIG. 11.

The flow of the refrigerant in this case is the same as that of the second embodiment (see FIG. 8) as indicated with arrows of solid line in FIG. 14.

The control method on the rotational frequency of the compressor 2 and the revolution of the outdoor fan 19 will be described with reference to FIGS. 15-1 and 15-5.

The controller 33 receives the operation mode of each indoor unit through the indoor unit operation controllers 30a-30c. When the controller 33 detects the concurrence of a room heating indoor unit and a room cooling indoor unit, it compares the total capacity required for room heating operation with the total capacity required for room cooling operation based on the number of the room heating units and the number of room cooling units. When the total capacity required for room cooling is greater than that required for room heating, the controller 33 judges that it is now under the operation mode wherein room cooling is principally performed. And, in accordance with the flow chart of FIG. 15-5, the controller 33 controls the rotational frequency of the compressor 2 so that the capacity of the room cooling units reaches a predetermined value, and controls the revolution of the outdoor fan 19 so that the capacity of the room heating units reaches a predetermined value.

In detail, firstly, the controller seeks the smallest value (MIN$\Delta T_j^C$) among $\Delta T_j$ of the room cooling units. When the smallest value is in a predetermined control target range, the controller 33 outputs to the compressor the present command value $f_{comp}$ of the rotational frequency of the compressor 2 as a new command value $f^*_{comp}$.

When the smallest value (MIN$\Delta T_j^C$) amoung $\Delta T_j$ of the room cooling units is smaller than the lower limit ($-\alpha$) of the control target range, the controller 33 judges that there is a unit short of capacity among the room cooling units, and outputs to the compressor 2 as a new command value $f^*_{comp}$ a value which is obtained by adding $\Delta f_{comp}$ to the present command value $f_{comp}$ of the rotational frequency of the compressor 2.

When the smallest value (MIN$\Delta T_j^C$) among $\Delta T_j$ of the room cooling indoor units is greater than upper limit ($+\alpha$) of the control target range, the controller 33 judges that the capacity of all room cooling indoor units is excessive, and outputs the compressor 2 as a new command value $f^*_{comp}$ a value which is obtained by substrating $\Delta f_{comp}$ from the present command value $f_{comp}$ of the rotational frequency of the compressor 2.

On the other hand, the revolution of the outdoor fan 19 is controlled based on the maximum value (MAX$\Delta T_j^H$) among $T_j$ of room heating indoor units. Specifically, when the greatest value (MAX$\Delta T_j^H$) among $\Delta T_j$ of the room heating units is in a predetermined control target range, the controller 33 outputs to the outdoor fan 19 as a new command value $f^*_{fan}$ the present command value $f_{fan}$ of the revolution of the outdoor fan 19.

When the greatest value (MAX$\Delta T_j^H$) among $\Delta T_j$ of the room heating units is greater than upper limit ($+\alpha$) of the control target range, the controller 33 judges that there is a unit short of capacity among the room heating units, and outputs to the outdoor fan 19 as a new command value $f^*_{fan}$ a value which is obtained by adding $\Delta f_{fan}$ to the present command value $f_{fan}$ of the revolution of the outdoor fan 9.

When the greatest value (MAX$\Delta T_j^C$) among $\Delta T_j$ of the room heating units is smaller than the lower limit ($-\alpha$) of the control target range, the controller 33 judges that the capacity of all room heating units is excessive, and outputs to the outdoor fan 19 as a new command value $f^*_{fan}$ a value which is obtained by subtracting $\Delta f_{fan}$ from the present command value $f_{fan}$ of the revolution of the outdoor fan 19.

In accordance with the fourth embodiment, the air conditioning device can exhibit sufficient cooling and heating capability to meet cooling and heating demand of the room with each indoor unit installed in it, thereby improving operation efficiency.

Although in the fourth embodiment, the air conditioning device is so constructed that the controller 33 receives through the indoor unit operation controllers 30a-30c the operation mode of each indoor unit and the temperature difference between a set temperature and inspired air temperature of each indoor unit, the present invention is not liiited to such structure, and signals indicative of the operation mode and the temperature difference can be input to the controller 33 in a different manner.

Although in the fourth embodiment, a variable rotation frequency type of compressor is utilized as a volume control type compressor to be able to adjust the rotational frequency of the compressor, thereby controlling the volume of the compressor, the present invention is not limited to such case. The present invention is also applicable to a case wherein a plurality of compressors are arranged and the number of driving compressor is adjusted. Compressors which can carry out volume control can be utilized to embody the present invention.

Although in the fourth embodiment, the outdoor fan is used as the heat exchanging amount changing means for the outdoor heat exchanger, and the revolution of the outdoor fan is controlled to adjust heat exchanging amount, the present invention is not limited to such case. The present invention is applicable to any manner wherein the air volume of the outdoor heat exchanger can be adjusted. A plurality of outdoor fans can be arranged, and the number of driving fans can be controlled to offer a similar effect.

A plurality of outdoor heat exchangers can be arranged in parallel, and the number of driving outdoor heat exchangers can be controlled to adjust the total heat exchanging amount of the outdoor heat exchangers.

Although in the fourth embodiment, the room temperature is detected based on the temperature of air inspired into each indoor unit, e.g. a thermal sensor can be provided in the room with each indoor unit in it, independently of the indoor unit, to detect the room temperature.

Even if the outdoor unit is connected to indoor units having different rated capacity, the operation mode or the rated capacity of the outdoor unit can be input to the controller 33 to accurately detect the operation mode, thereby optimizing operation control.

Next, a fifth and a sixth embodiment of the present invention will be described in detail in reference to FIGS. 16 through 20.

Figure 16:
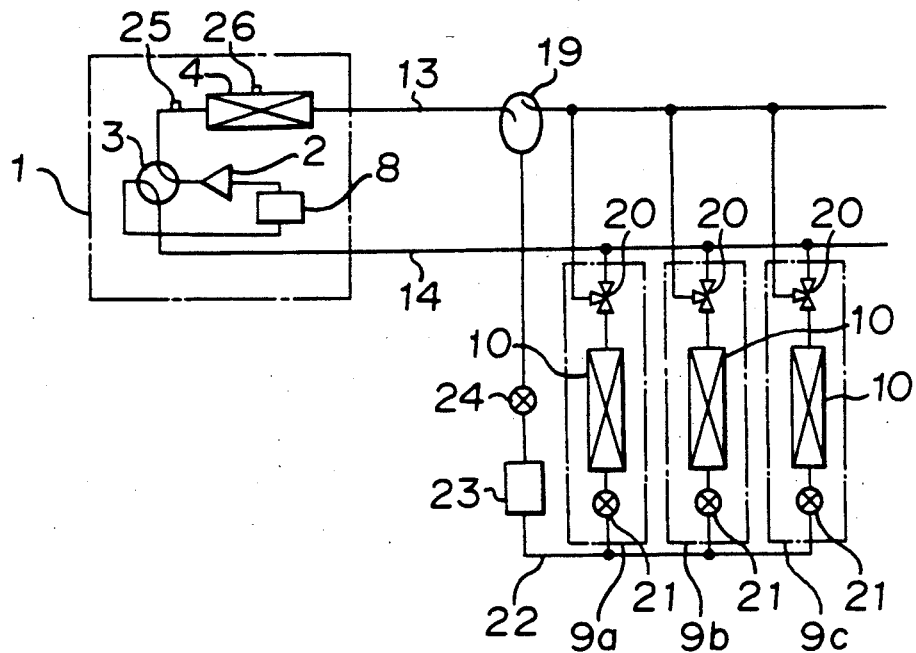
FIG. 16 is a schematic diagram showing the refrigerant system of the air conditioning device of a fifth embodiment according to the present invention.

As shown in FIG. 16, the fifth embodiment is different from the first embodiment in that a gas-liquid separator 19 for separating the refrigerant into a gas and a liquid is arranged at the junction between the first connecting pipe 13 and the third connecting pipe 22, that a receiver 23 is arranged in the third connecting pipe 22 at a position between the first electric expansion valves 21 and the second electric expansion valve 24, that a first thermal sensor 25 is placed on the pipe extending from the reversing valve 3 to the outdoor heat exchanger 4, and that a second thermal sensor 26 is placed on a heat exchanging tube which is substantially at an intermediate location of the outdoor heat exchanger 4. The reference numeral 8 designates an accumulator.

The operation of the air conditioning device which is constructed according to the fifth embodiment will be explained.

Figure 17:
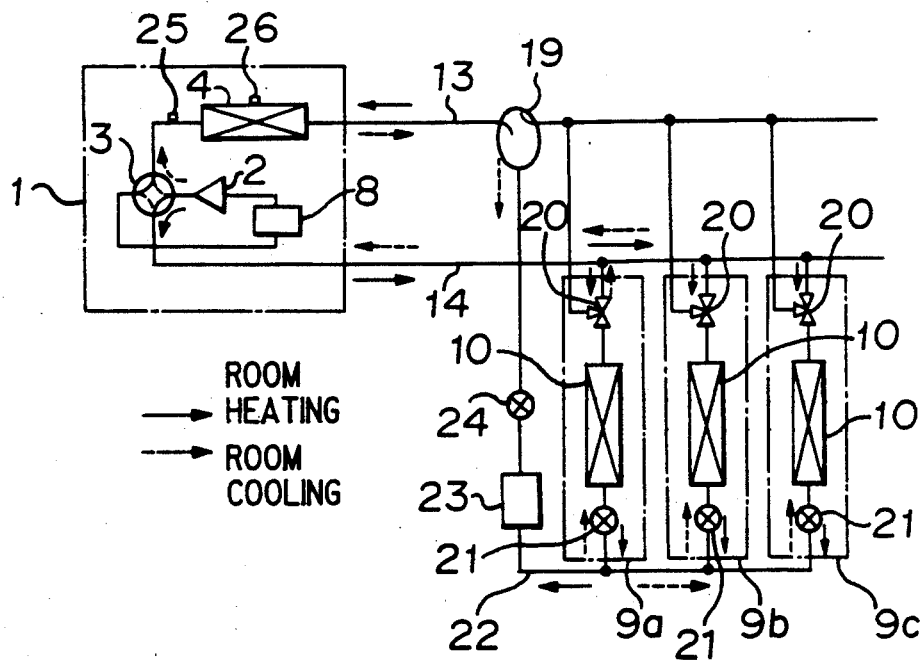
FIG. 17 is a refrigerant circulation diagram showing the operation which is carried out when either only room cooling or only room heating is performed in the air conditioning device of FIG. 16.

As shown in FIG. 17, the flow of the refrigerant on room heating only or room cooling only is the same as that of the first embodiment as shown in FIG. 2.

Figure 18:
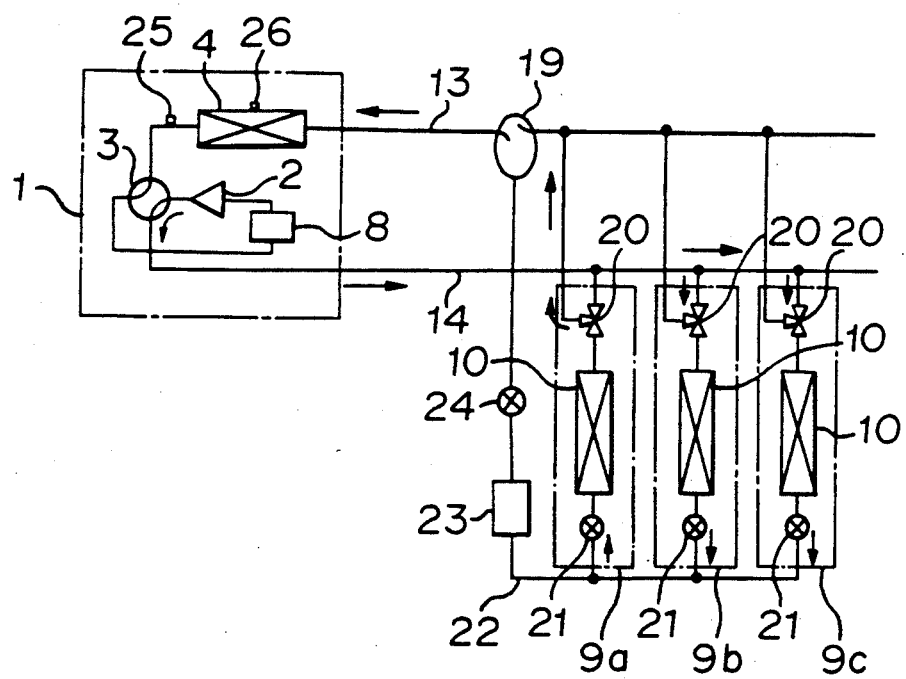
FIG. 18 is a refrigerant circulation diagram showing the operation which is carried out when room heating is principally performed in the air conditioning device of FIG. 16.

As shown in FIG. 18, the flow of the refrigerant when room heating is principally performed under room cooling and room heating concurrent operation is the same as that of the first embodiment as shown in FIG. 3. The quantity of flow of the refrigerant which is passing through the second electric expansion valve 24 is controlled based on the detection of the superheating degree of the refrigerant by the first and the second thermal sensors 25 and 26 on the outdoor heat exchanger 4 so that the refrigerant has a predetermined superheating degree.

Figure 19:
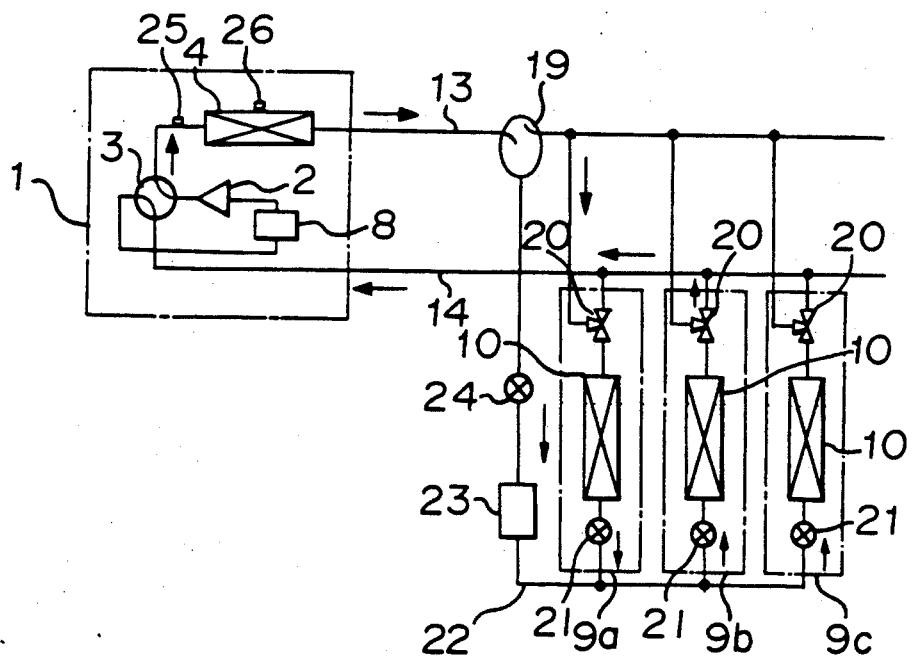
FIG. 19 is a refrigerant circulation diagram showing the operation which is carried out when room cooling is principally performed in the air conditioning device of FIG. 16.

When room cooling is principally performed under the room cooling and room heating concurrent operation, as shown in FIG. 19, the refrigerant which has been discharged from the compressor 1 flows into the outdoor heat exchanger 4 where the refrigerant carries out heat exchanging at an arbitrary amount to become a gas-liquid two phase state having a high temperature and a high pressure. After that, the refrigerant enters the gas-liquid separator 19 in the first connecting pipe 13. After the refrigerant is separated into a gas and a liquid in the separator, it is forwarded toward indoors. The gaseous refrigerant which has been separated in the separator 19 is directed through the three port switching valve 20 into an indoor unit 9a under room heating operation. The refrigerant carries out heat exchanging (room heating) in the indoor heat exchanger 10 of the heating indoor unit to be condensed and liquefied, and the refrigerant flows into the third connecting pipe 22 through the first electric expansion valve 21.

On the other hand, the liquid refrigerant which has been separated in the separator 19 passes through the second electric expansion valve 24 in the third connecting pipe 22, and flows into the receiver 23. At this time, the quantity of flow of the refrigerant which is passing through the third connecting pipe 22 is controlled based on a signal from a liquid level detector (such as a known float switch) in the separator 19 so that the liquid level in the separator 19 is in a predetermined range. Specifically, when the liquid level is higher than the predetermined range, the opening degree of the second electric expansion valve 24 is increased. When the liquid level is lower than the predetermined range, the opening degree of the second electric expansion valve 24 is decreased. Under this control, only the liquid refrigerant is always passing through the third connecting pipe 22. The refrigerant from the receiver 23 joins with the refrigerant from the room heating unit 9a, and flows from the third connecting pipe 22 into room cooling units 9b and 9c. After the refrigerant is depressurized by the first electric expansion valves 21 to a low pressure, the refrigerant carries out heat exchanging (room cooling) in the indoor heat exchangers 10 to be evaporated. The gaseous refrigerant thus produced enters the second connecting pipe 14 through the three port switching valves 20, and returns to the compressor 2 again. In this way, the circulation cycle is formed to carry out the room cooling and room heating concurrent operation wherein room cooling is principally performed.

In the fifth embodiment, the receiver 23 is arranged in the third connecting pipe 22, and the electric expansion valves 21 and 24 as the first and the second flow controllers control the superheating degree and the subcooling degree of the refrigerant in the outdoor heat exchanger 4 and the outdoor heat exchangers 10 which work as an evaporator or a condenser. As a result, in the case of room cooling only or room heating only, or under the cooling and room heating concurrent operation, the fluctuation of the quantity of the refrigerant due to the changes in the number of driving indoor units 9b, 9c, or the change in air conditions can be adjusted by the receiver 23.

Figure 20:
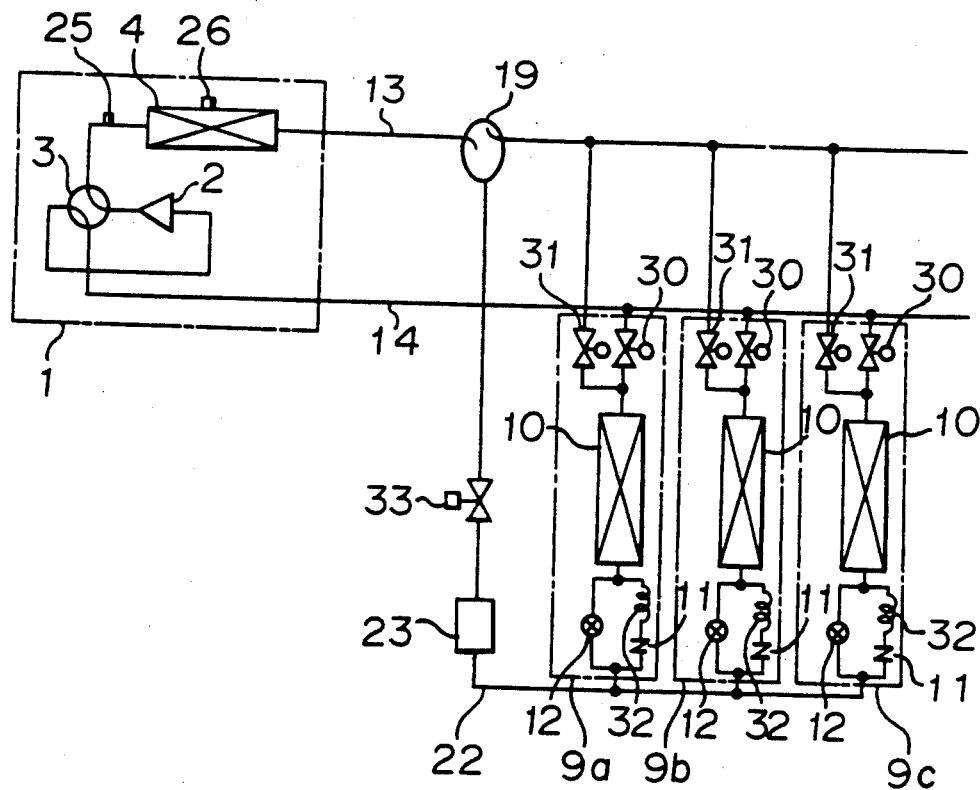
FIG. 20 is a schematic diagram showing the entire structure of the refrigerant system of the air conditioning device of a sixth embodiment of the present invention.

Although in the fifth embodiment, the three port switching valves 20 are arranged to make a selective connection to the first connecting pipe 13 and to the second connecting pipe 14, two switching valves such as solenoid valves 30, 31 can be arranged in the indoor units to obtain the selection of connection as shown in FIG. 20. Although the fifth embodiment has been explained in reference to the case wherein the indoor 1 units 9a–9c are provided with the electric expansion valves 21 as the first flow controllers, the first flow controllers can be constituted by a parallel connection of a temperature-operated expansion valve 12 and a series connection of a capillary tube 32 and a check valve 11 so that in a room cooling indoor unit the temperature-operated expansion valve 12 depressurizes the refrigerant to a low pressure, and in a room heating indoor unit the refrigerant from the indoor heating exchanger 10 flows into the third connecting pipe 22 through the capillary tube 32 and the check valve 11, which is shown as the sixth embodiment in FIG. 20. Although in the fifth embodiment the second electric expansion valve 24 is arranged in the third connecting pipe 22, the second electric expansion valve can berereplaced by a device which can take a similar action. For example, an opening and closing valve of an electric flow adjusting valve 33 (such as a tall valve) as shown in FIG. 20. Although in the fifth embodiment the thermal sensor is placed on the heat exchanging tube at an intermediate portion of the outdoor heat exchanger 4, the thermal sensor can be placed on the junction between the outdoor heat exchanger 4 and the first connecting pipe 13. A pressure sensor can take the place of the thermal sensor.

Now, a seventh and an eighth embodiments of the present invention will be described in detail with reference to FIGS. 21 through 25.

Although explanation on these embodiments will be made in reference to the case wherein a single outdoor unit as a heat source device is connected to three indoor units, the explanation is also applicable to the case wherein the outdoor unit is connected to two or more indoor units.

Figure 21:
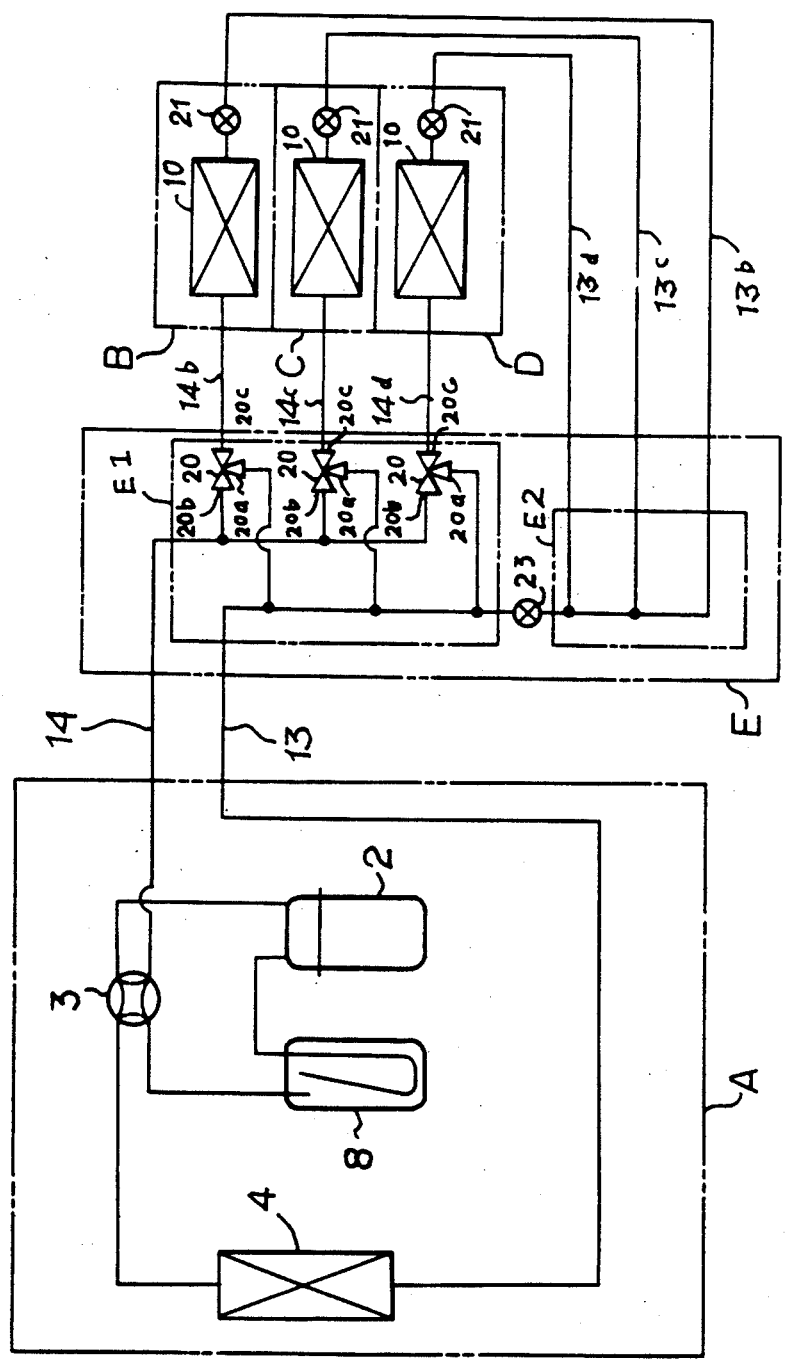
FIG. 21 is a schematic diagram showing the refrigerant system of the air conditioning device of a seventh embodiment according to the present invention.

In FIG. 21, reference A designates the outdoor unit as the heat source device. References B, C and D designate indoor units which are connected in parallel as described later and have the same structure as each other. Reference E designates a junction device which includes a first branch joint, a second flow controller, and a second branch joint, as described later.

The indooor unit as the heat source device A is connected by a compressor 2, a reversing valve 3 for switching the flow direction of a refrigerant in the heat source device, an outdoor heat exchanger 4, and an accumulator 8 connected to the devices 2 through 4. Reference numeral 10 designates three indoor heat exchangers. Reference numeral 14 designates a second connecting pipe which connects the reversing valve 3 of the heat source device A to the junction device E. Reference numerals 14b, 14c and 14d indicate first indoor connecting pipes which connect the junction device E to the indoor units B, C and D, respectively, and correspond to the second connecting pipe 14. Reference numeral 13 designates a first connecting pipe which connects the outdoor heat exchanger 4 of the heat source device A to the junction device E. Reference numerals 14b, 14c and 14d indicate first indoor connecting pipes which connect the junction device E to the indoor heat exchangers 10 of the indoor units B, C and D, respectively, and correspond to the first connecting pipe 13. Reference numeral 20 designates three port switching valves which can selectively connect the second indoor connecting pipes 14b, 14c and 14d to either the first connecting pipe 13 or the second connecting pipe 14. Reference numeral 21 designates first flow controllers which have one ends connected to the indoor heat exchangers 10 at positions near to the heat exchangers and the other ends connected to the second indoor connecting pipes 14b, 14c and 14d, respectively. The first flow controllers are controlled depending on superheater amount on cooling and subcool amount on heating at the side of the exists of the indoor heat exchangers 10. Reference E1 designates the first branch joint which comprises three port switching valves 20 which can selectively connect the second indoor connecting pipes 14b, 14c and 14d to either the first connecting pipe 13 or the second connectng pipe 14. Reference E2 designates the second branch joint which comprises the first indoor connecting pipes 13b, 13c and 13d, and the first connecting pipe 13. Reference numeral 23 designates the second flow controller which connects between the portion of the first connecting pipe 13 in the first branch joint E1 and the portion of the first connecting pipe 13 in the second branch joint E2, and which can be opened and closed.

The operation of the seventh embodiment which is constructed as stated above will be explained.

Figure 22:
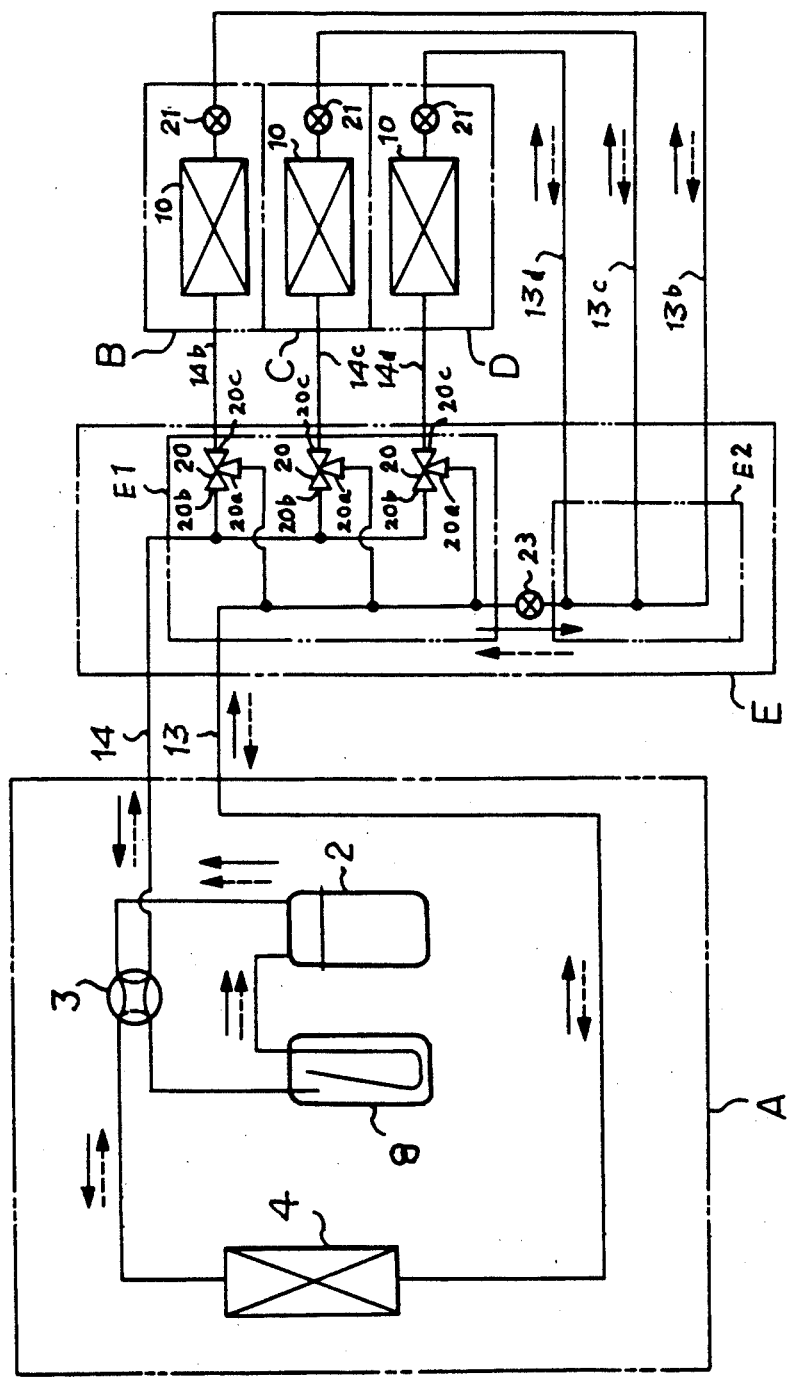
FIG. 22 is a schematic diagram showing the operation which is carried out when either only room cooling or only room heating is performed in the seventh embodiment of FIG. 21.

Firstly, the case wherein room cooling only is performed will be described in detail in reference to FIG. 22.

The refrigerant which has been discharged from the compressor 2 and is a gas having a high temperature and high pressure passes through the reversing valve 3 as indicated in arrows of solid line, and carries out heat exchanging in the outdoor heat exchanger 4 to be condensed and liquefied. After that, the liquid refrigerant passes through the first connecting pipe 13 and the second flow controller 23, and enters the indoor units B, C and D through the second branch joint E2 and the first indoor connecting pipes 13b, 13c and 13d. The refrigerant has entered the indoor units B, C and D, is depressurized to a low pressure by the first flow controllers 21, and carries out heat exchanging with indoor air in the indoor heat exchangers 10 to be evaporated and gasified, thereby cooling each room with each indoor unit in it. The gaseous refrigerant passes through the second indoor connecting pipes 14b, 14c and 14d, the three port switching valves 20, the first branch joint El, the second connecting pipe 14, the outdoor unit reversing valve 3, and the accumulator 8, and then is inspired into the compressor 2. In this way, the circulation cycle is formed to carry out cooling operation. At this time, the three port switching valves 20 have their first port 20a closed and their second port 20b and third port 20c opened.

Secondly, the case wherein only room heating operation is carried out will be described in detail with reference to FIG. 22. As indicated in arrows of dotted line, the refrigerant which has been discharged from the compressor 2 and is a gas having a high temperature and a high pressure passes through the reversing valve 3, the first connecting pipe 14, the second branch joint El, the three port switching valves 20, and the second indoor connecting pipes 14b, 14c and 14d. And then, the refrigerant enters the indoor units B, C and D where it carries out heat exchanging with indoor air to be condensed and liquefied thereby heating each room with each indoor unit in it. The liquid refrigerant passes through the first flow controllers 21 and the first indoor connecting pipes 13b, 13c and 13d flows into the second branch joint E2 and joints together there. Then, the refrigerant passes through the second flow controller 23. The refrigerant is depressurized to become gas-liquid two phase state having a low pressure by either the first flow controllers 21 or the second flow controller 23. The refrigerant thus depressurized enters the outdoor heat exchanger 4 in the heat source device A, through the first connecting pipe 13, and carries out heat exchanging in the outdoor heat exchanger to be evaporated. The refrigerant thus gasfied is inspired into the compressor 2 through the reversing valve 3 and the accumulator 8 in the heat source device. In this way, the circulation cycle is formed to carry out room heating operation. At this time, the three port switching valves 20 have their ports taken the same positions as the room cooling operation as stated just above.

Figure 23:
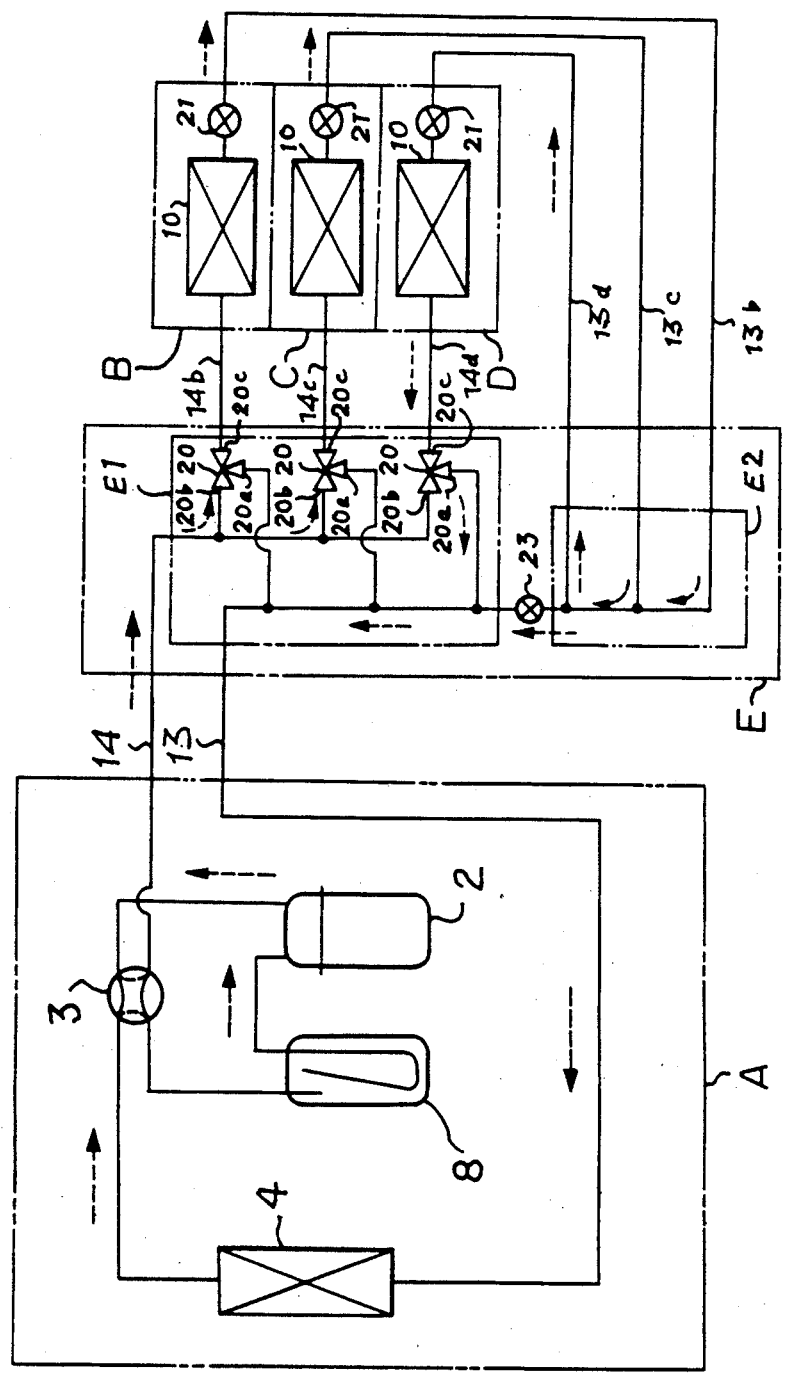
FIG. 23 is a schematic diagram showing the operation which is carried out when room heating is principally performed in the seventh embodiment of FIG. 21 (i.e. when room heating operation capacity is greater than room cooling operation capacity)

Thirdly, the case wherein room heating is principally performed under the room cooling and room heating concurrent operation will be described in detail with reference to FIG. 23. As indicated in arrows of dotted line, the refrigerant which has been discharged from the compressor 2 and is a gas having a high temperature and a high pressure is fed to the junction device E through the second connecting pipe 14. The refrigerant passe through the first branch joint E1, the three port switching valves 20, and the second indoor connecting pipes 14a, 14c, and flows into the indoor units B and C which are expected to carry out room heating. The refrigerant which have been entered the indoor units carries out heat exchanging with the indoor air in the indoor heat exchangers 10 to be condensed and liquefied, thereby heating each room with each indoor unit in it. The refrigerant thus condensed and liquefied passes through the first flow controllers 21 which are substantially fully opened, is depressurized there to a predetermined extent, and flows into the second branch joint E2. A part of the refrigerant passes through the second indoor connecting pipe 13d, enters the indoor unit D which is expected to carry out room cooling. The refrigerant which has entered the indoor unit D passes through the first flow controller 21, is depressurized there, and then carries out heat exchanging in the indoor heat exchager 5 to be evaporated and gasified thereby to cooling the room with the indoor unit D in it. Then, the refrigerant flows into the second connecting pipe 12 through the three port switching valve 20.

On the other hand, the other part of the refrigerant flows into the first connecting pipe 14 through the second branch joint E2 and the second flow controller 23. In the first connecting pipe 13, the other part of the refrigerant is combined with the part of the refrigerant which has passed to the indoor unit D, flows into the outdoor heat exchnager 4 in the heat source device A, and carries out in the heat exchanger to be evaporated and gasified. After that, the refrigerant is inspired into the compressor 2 through the reversing valve 3 and the accumulator 8 in the heat source device. In this way, the circulation cycle is formed to carry out the room cooling and room heating concurrent operation wherein room heating is principally performed. At this time, the three port switching valves 20 which are connected to the indoor units B and C have their first port 20a closed and their second port 20b and third port 20c opened. The three port switching valve 20 which is connected to the indoor unit D has its second port 20b closed, and its first port 20a and the third port 20c opened.

Figure 24:
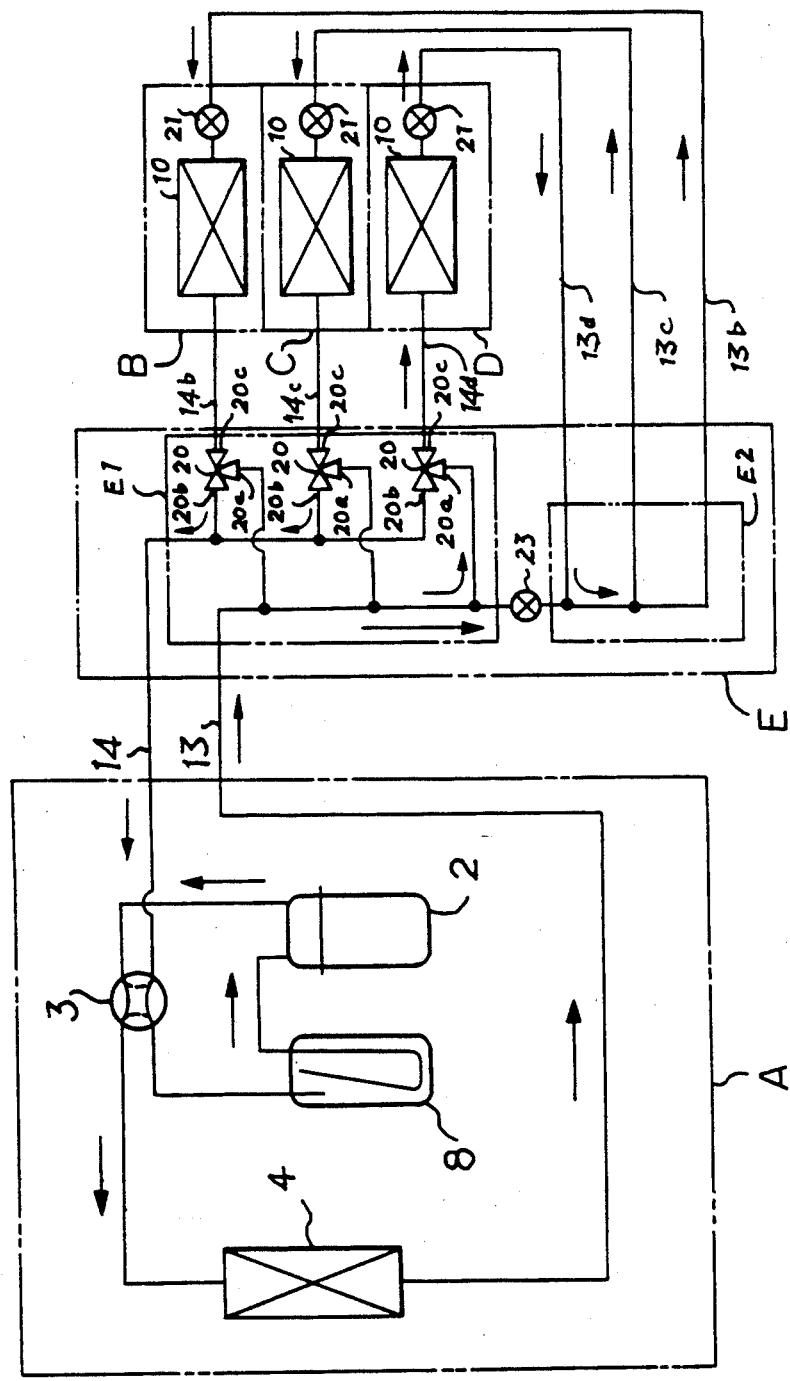
FIG. 24 is a schematic diagram showing the operation which is carried out when room cooling is principally performed in the seventh embodiment of FIG. 21 (room cooling operation capacity is greater than room heating capacity)

Fourthly, the case wherein room cooling is principally performed under the room cooling and room heating concurrent operation will be described in detail with reference to FIG. 24. As in indicated in arrows of solid line, the refrigerant which has been discharged from the compressor 2 and is a gas having a high temperature and a high pressure carries out heat exchanging at an arbitrary amount in the outdoor heat exchanger 4 to become a gas-liquid two phase state having a high temperature and a high pressure. The refrigerant is fed to the junction device E through the first connecting pipe 13. A part of the refrigerant passes through the first branch joint E1, the three port switching valve 20 and the first indoor connecting pipe 14d, and enters the indoor unit D which is expected to carry out room heating. In the indoor heat exchanger 10 of the indoor unit D, this part of the refrigerant carries out heat exchanging with indoor air to be condensed and liquefied, thereby heating the room with the indoor unit D in it. Then, this part of the refrigerant flows into the second branch joint E2 through the first flow controller 21 which is substantially fully opened. On the other hand, the other part of the refrigerant enters the second branch joint E2 through the second flow controller 23, and joins with the part of the refrigerant which has passed through the room heating indoor unit D. And then, the combined refrigerant enters the indoor unit B and C through the second branch joint E2 and the first indoor connecting pipes 13b and 13c. The refrigerant which has flowed into the indoor units B and C is depressurized to a low pressure by the first flow controllers 21, flows into the indoor heat exchangers 10 in the indoor units B and C, and carries out heat exchanging with indoor air to be evaporated and gasified, thereby cooling each room with each indoor unit B or C in it. The refrigerant thus gasified is inspired into the compressor 2 through the second indoor connecting pipes 14b and 14c, the three port switching valves 20, the second branch joint E1, the first connecting pipe 14, the heat source device reversing valve 3, and the heat source device accumulator 8. In this way, the circulation cycle is formed to carry out the room cooling and room heating concurrent operation wherein room cooling is principally performed. At this time, the three port switching valves 20 which are connected to the indoor units B, C and D have their first port 20a-20c taken the same positions as the room cooling and room heating concurrent operation wherein room heating is principally performed.

Figure 25:
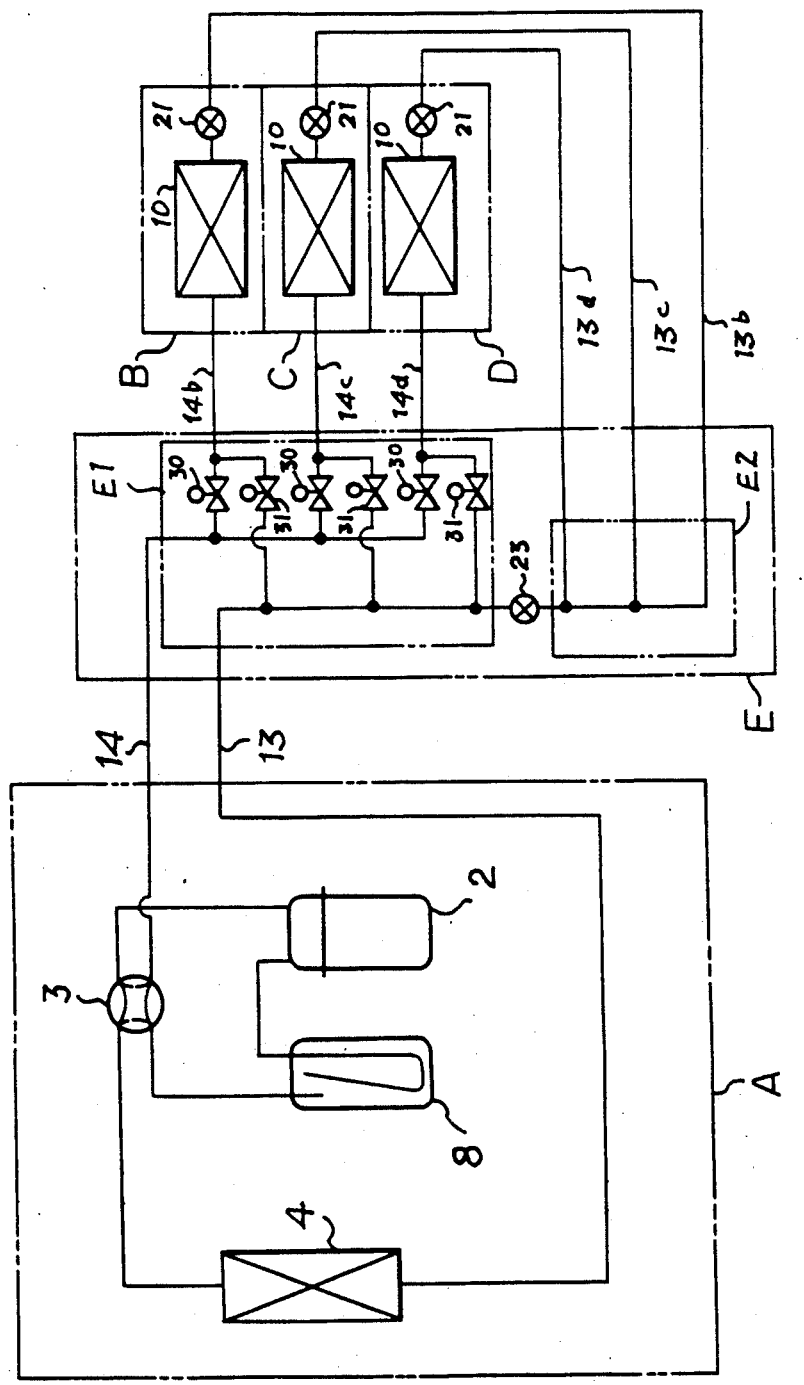
FIG. 25 is a schematic diagram showing the refrigerant system of the air conditioning device of an eighth embodiment according to the present invention.

Although in the seventh embodiment the three port switching valve 20 allow the second indoor connecting pipes 14b, 14c and 14d to be selectively connected to either the first connecting pipe 13 or the second connecting pipe 14, a parallel combination of two solenoid valves 30 and 31 can be substituted for the three port valve like the eighth embodiment of FIG. 25, and the solenoid valves can be actuated in the same switching operation to offer a similar advantage.

Next, a ninth and a tenth embodiment of the present invention will described n detail with reference to FIGS. 26 through 30.

Figure 26:
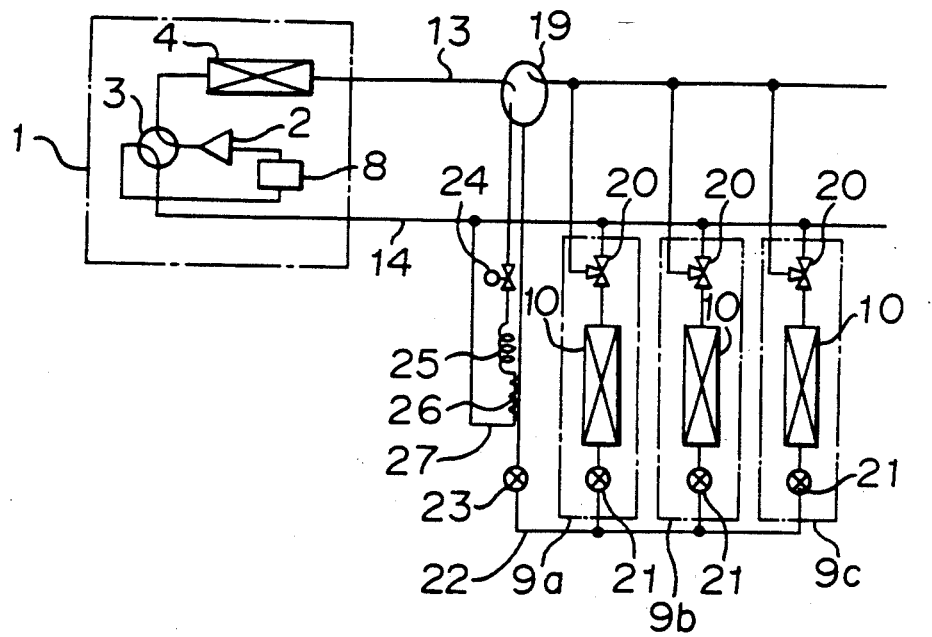
FIG. 26 is a schematic diagram showing the refrigerant system of the air conditioning device of a ninth embodiment according to the present invention.

As shown in FIG. 26, the ninth embodiment is different from the fifth embodiment of FIG. 16 in that there is provided a bypass pipe 27 which extends from a substantially central portion of the gas-liquid separator 19 in the vertical direction to the second connecting pipe 14. In the bypass pipe 27, there are arranged a solenoid valve 24 which functions as an opening and closing device, a capillary tube 25 which surves as a flow controller, and a heat exchanging portion 26 which carries out heat exchanging at a position of the third connecting pipe 22 which is located between the gas-liquid separator 19 and the second electric expansion valve 23. The heat exchanging portion 26 can be constituted by e.g. a dual tube type heat exchanger. In addition, the ninth embodiment is different from the fifth embodiment in that the third connecting pipe 22 does not have the receiver 23, and that the outdoor unit can be free from the thermal sensors 25 and 26 in it.

The operation of the air conditioning device of the ninth embodiment which is constructed as mentioned above will be described in detail.

Figure 27:
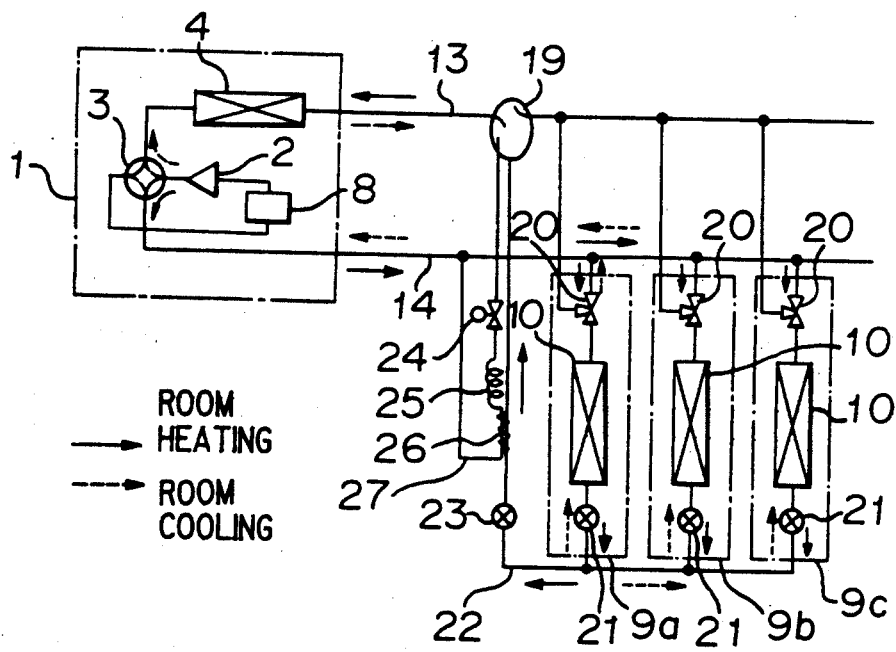
FIG. 27 is a refrigerant circulation diagram showing the operation which is carried out when either only room cooling or only room heating is performed in the air conditioning device of FIG. 26.

As shown in FIG. 27, the flow of the refrigerant on room heating only or room cooling only is the same as that in the fifth embodiment of FIG. 17.

Figure 28:
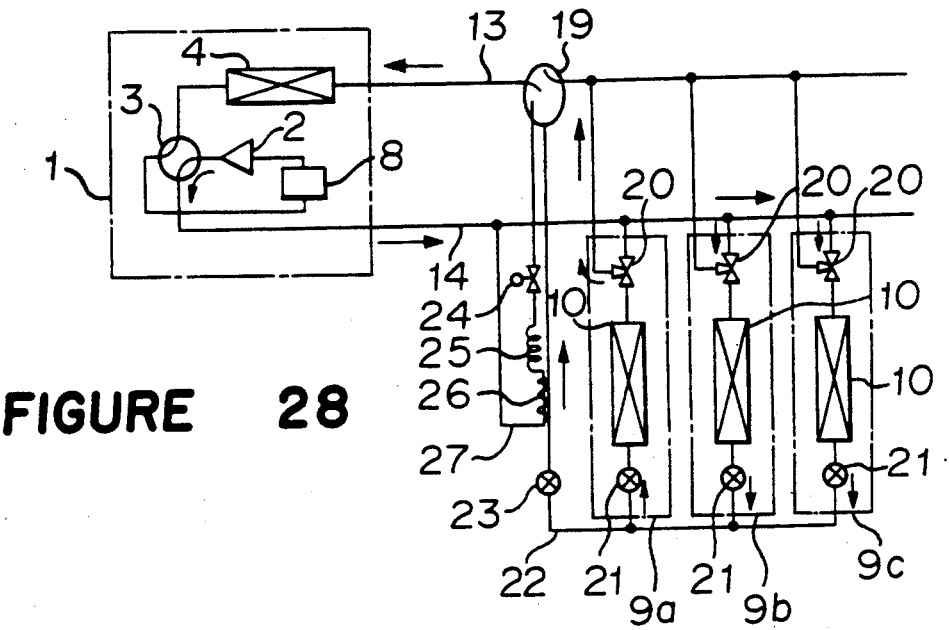
FIG. 28 is a refrigerant circulation diagram showing the operation which is carried out when room heating is principally performed in the air conditioning device of FIG. 26.

As shown in FIG. 28, the flow of the refrigerant under the room cooling and room heating concurrent operation wherein room heating is principally performed is the same as that in the fifth embodiment of FIG. 18.

Figure 29:
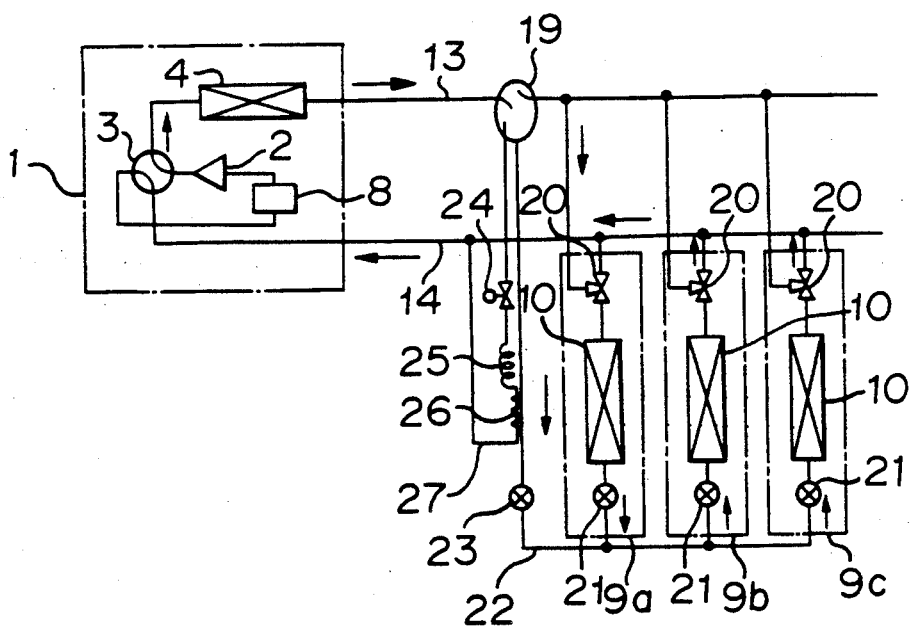
FIG. 29 is a refrigerant circulation diagram showing the operation which is carried out when room cooling is principally performed in the air conditioning device of FIG. 26.

In addition, as shown in FIG. 29, the flow of the refrigerant under the room cooling and room heating concurrent operation wherein room cooling is principally performed is similar to that in the fifth embodiment of FIG. 19. However, the connection of the bypass tube 27 to the gas-liquid separator 19 differentiates between both embodiments. In detail, the refrigerant which has been separated in the gas-liquid separator 19 and become liquefied flows into the bypass pipe 27 and as well as the third connecting pipe 22. The liquid refrigerant which has been flowed into the bypass pipe 27 is depressurized to a low pressure by the capillary tube 25, and then, the refrigerant carries out heat exchanging with the third connecting pipe 22 at the heat exchanging portion 26 (cooling refrigerant in the third connecting pipe 22) to be gasified. After that, the gaseous refrigerant in the bypass pipe 27 flows into the second connecting pipe 14. On the other hand, the liquid refrigerant which has flowed into the third connecting pipe 22 is cooled at the heat exchanging portion 26 by the refrigerant which is flowing through the bypass pipe 27, thereby being in a slightly subcooling state. And, the refrigerant passes through the second electric expansion valve 23, joins with the refrigerant from a room heating indoor unit 9a, and enters room cooling indoor units 9b and 9c. The refrigerant which has flowed into the room cooling indoor units 9b and 9c is depressurized to a low pressure by the first electric expansion valves 21. The refrigerant carries out heat exchanging in the indoor heat exchangers 10 to be evaporated. The refrigerant thus gasified flows into the second connecting pipe 14 through the three port switching valves 20, and returns to the compressor 2. In this way, the circulation cycle is formed to carry out the room cooling and room heating concurrent operation wherein room cooling is principally performed.

As explained, under the room cooling and room heating concurrent operation wherein room cooling is principally performed the air conditioning device of the ninth embodiment can cause the refrigerant in the bypass pipe 27 to carry out heat exchanging with the refrigerant in the third connecitng pipe 22, and the liquid refrigerant which has been separated in the gas-liquid separator 19 and is passing through the third connecitng pipe 22 therefore takes a subcooling state. As a result, even if there is pressure loss or the like because the length of the third connecting 22 extending from the gas-liquid separator 19 to the indoor units 9a-9c is long, the refrigerant can be prevented from being in a gas-liquid two phase state. This allows the refrigerant near to the inlet of the first electric expansion valves 21 of the room cooling indoor units 9b and 9c to be always in a liquid state regardless of the length of the third connecting pipe 22. In this way, good flow controllability can be given to the first electric expansion valves 21, and the room cooling and room heating concurrent operation can be effectively realized.

In addition, since the bypass pipe 27 is provided with the capillary tube 25 which functions as a flow controller whose flow existance changes depending on the gas-liquid state of the refrigerant, there is no possibility that the refrigerant in a gas form is flowing through the bypass pipe 27 at a great amount even if the liquid level of the refrigerant is lowered in the gas-liquid separator 19. As a result, the gaseous refrigerant continues to be fed to the room heating indoor unit 9a at a suitable amount, preventing room heating capability from greatly lowering.

Since the bypass pipe 27 allows the liquid level of the refrigerant in the gas-liquid separator 19 to maintain at a constant position, and an excessive refrigerant can be stored in the accumulator 8, no receiver is required in the third connecting pipe 22.

Figure 30:
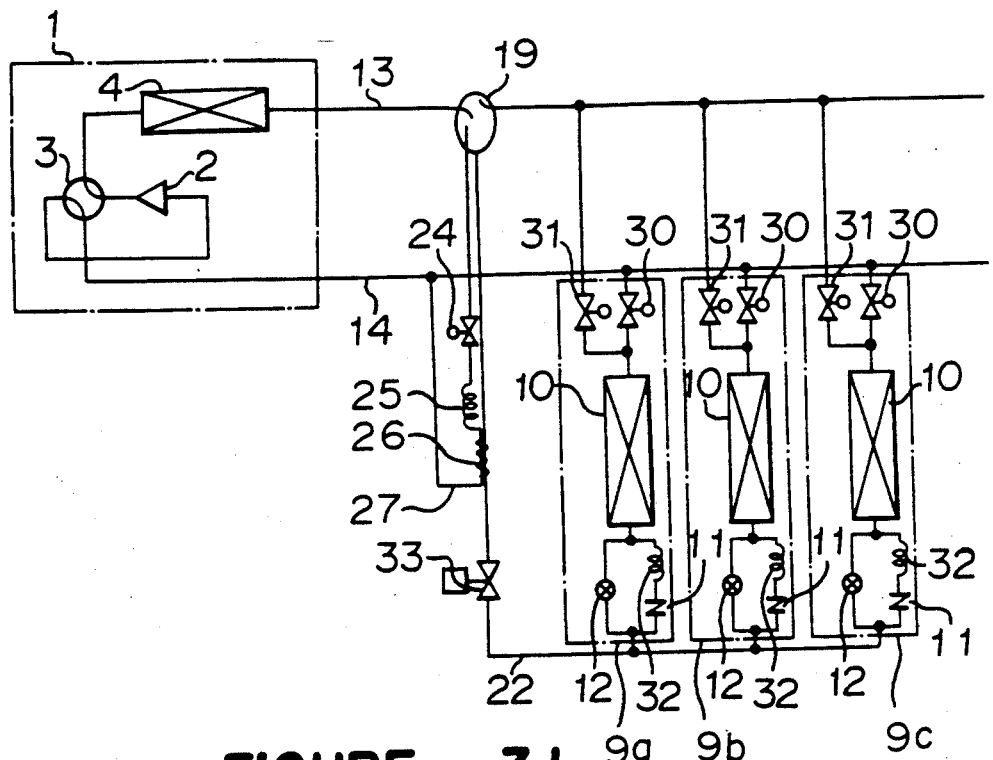
FIG. 30 is a schematic diagram showing the entire structure of the refrigerant system of the air conditioning device of a tenth embodiment according to the present invention.

The three port switching valves 20 of the ninth embodiment can be replaced by opening and closing valves such as paired solenoid valves 30, 31 as shown as the tenth embodiment in FIG. 30. The first electric expansion valves 21 of the ninth embodiment can be replaced by a parallel connection of a thermal expansion valve 12 and a series connection of a capillary tube 32 and a check valve 11 like the tenth embodiment of FIG. 30. An opening and closing valve such as an electric flow adjusting valve 33 (e.g. ball valve) like the tenth embodiment of FIG. 30 can be substituted for the second electric expansion valve 23 in the third connecting pipe 22 in the ninth embodiment In addition, although explanation on the ninth embodiment has been made with reference to the case wherein the bypass pipe 27 branches from the substantially intermediate portion of the gas-liquid separator 19 in the vertical direction, the branching portion can be arbitrarily selected as long as it is located between the connecting position of the third connecting pipe 22 and the opening of the first connecting pipe 13.

Next, an eleventh and a twelfth embodiment of the present invention will be described in detail in reference to FIGS. 31 through 36.

Figure 31:
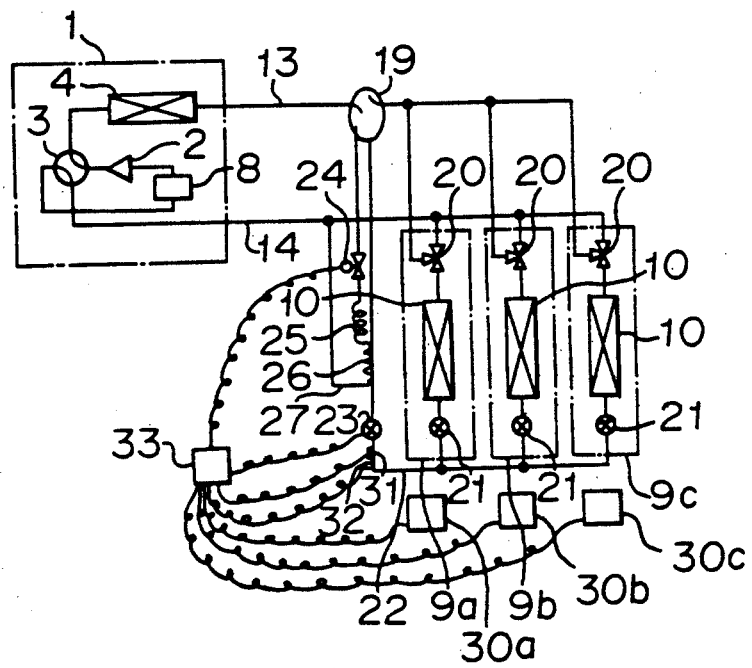
FIG. 31 is a schematic diagram showing the entire structure of the refrigerant system of the air conditioning device of an eleventh embodiment according to the present invention.

As shown in FIG. 31, the eleventh embodiment is different from the ninth embodiment of FIG. 26 in that it is provided with indoor unit operation controllers 30a–30c and a controller 33.

Indoor unit operation controllers 30a–30c output a operation mode signal for each indoor unit 9a, 9b or 9c to the controller 33. Reference numerals 31 and 32 designate a thermal sensor such as a thermistor and a pressure sensor such as an electric pressure tranducer, respectively, which are arranged in the portion of the third connecting pipe 22 which is between the first electric expansion valvss 21 and the second electric expansion valve 23. The controller 33 receives signals from the indoor unit operation controllers 30a–30c, the thermal sensor 31, and the pressure sensor 32, and outputs a signal for adjusting the opening degree of the second electric expansion valve 23 and a signal for controlling the opening and closing of the solenoid valve 24.

Figures 1, 35:
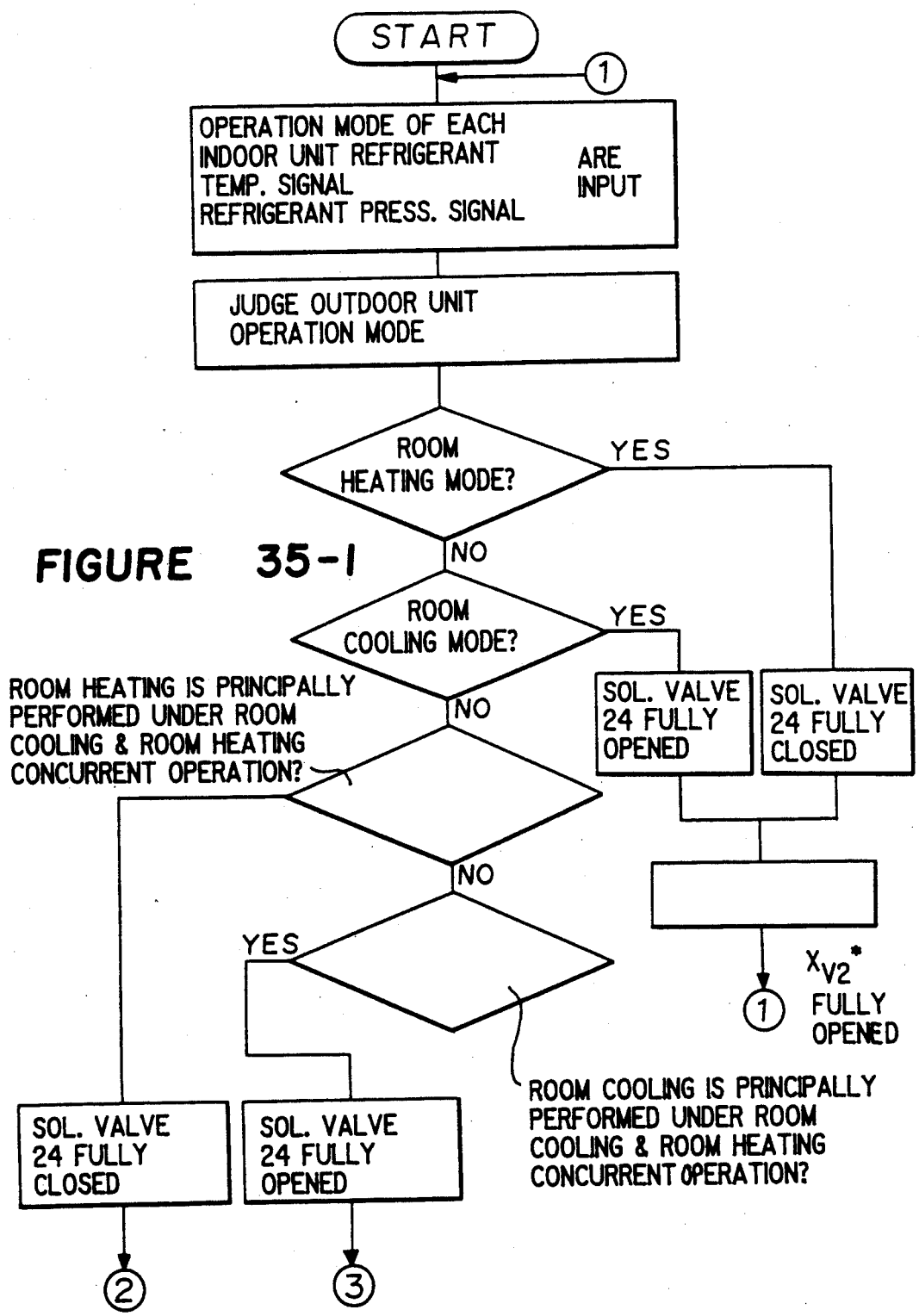
Figures 2, 35:
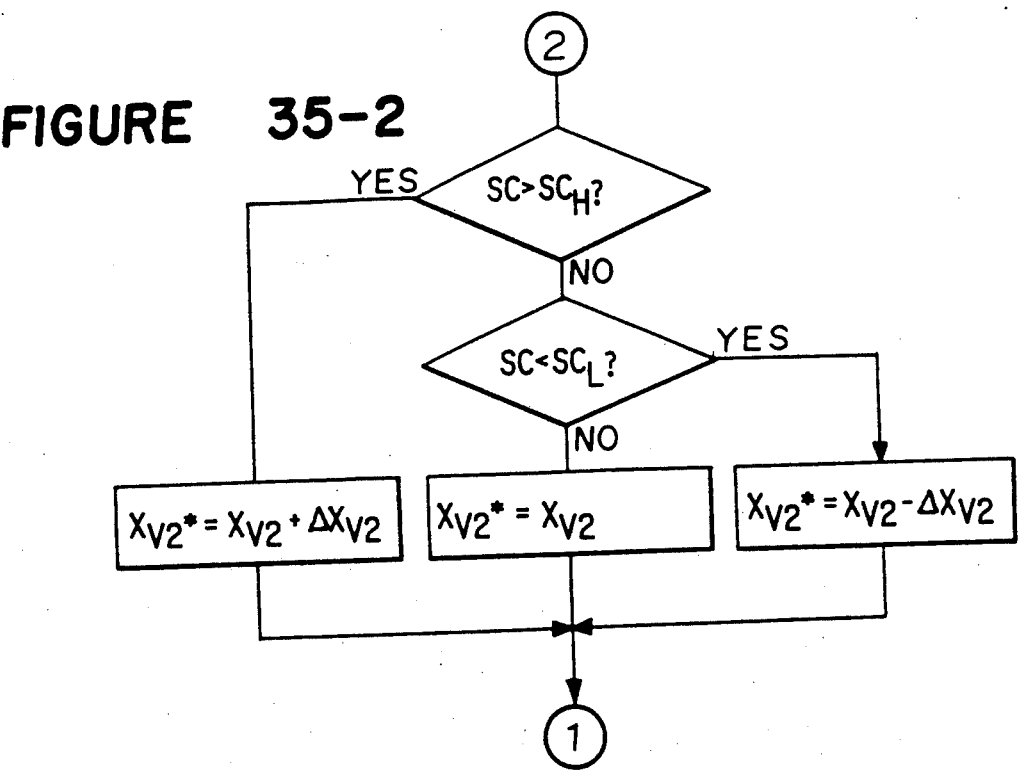
Figures 3, 35:
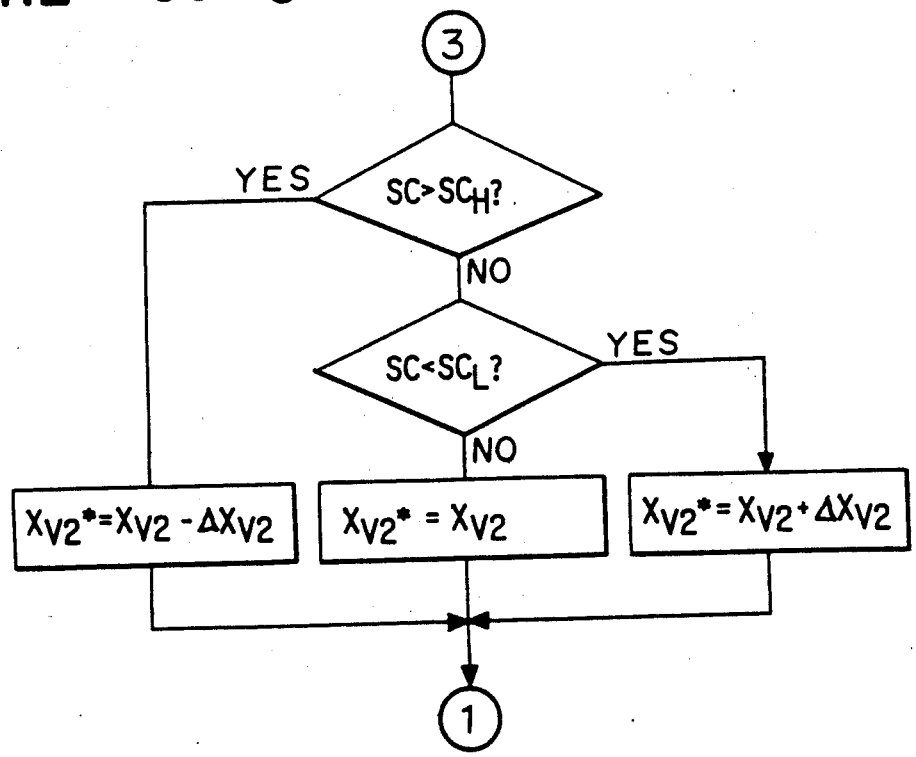
Figure 36:
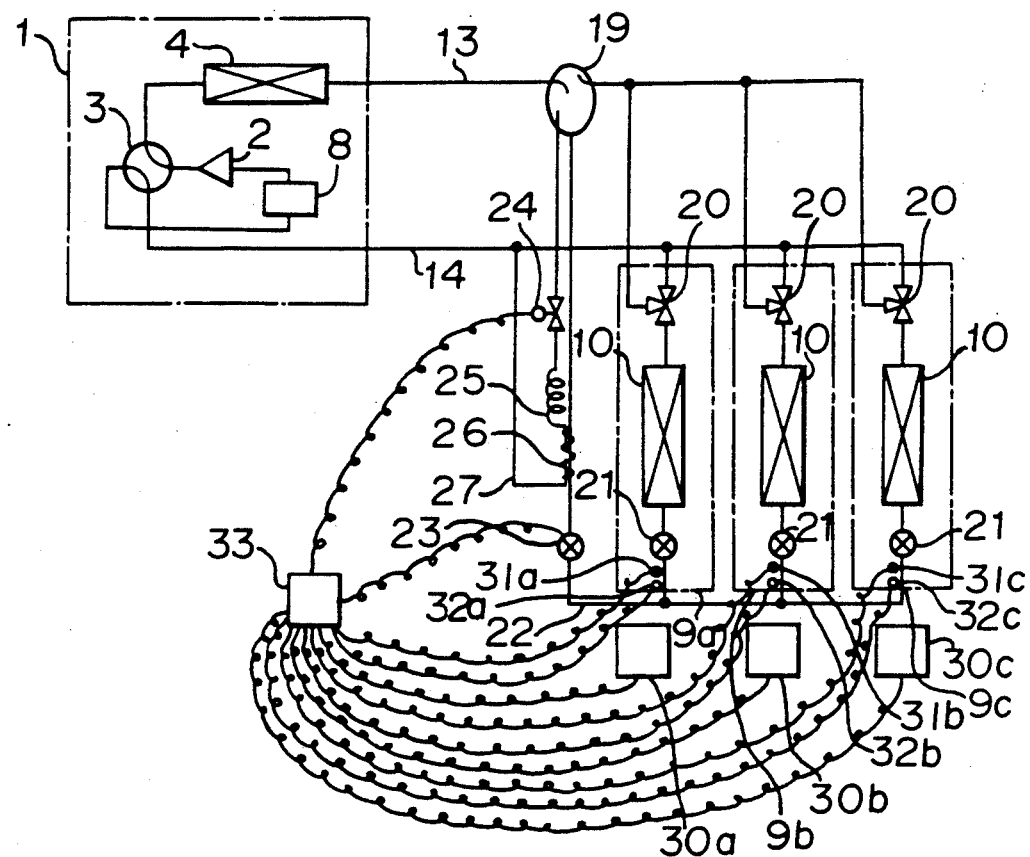
FIG. 36 is a schematic diagram showing the entire structure of the refrigerant system of the air conditioning device of twelfth embodiment according to the present invention.

In FIGS. 35-1 through 35-3, reference $X_{V2}$ represents the present command value on the opening degree of the second electric expansion valve 23. Reference $X_{V2}^*$ represents a new command value on the opening degree of the second electric expansion valve. Reference $\Delta X_{V2}$ represents a variation between the present command value and the new command value. Reference SC represents a subcooling degree of the refrigerant which is located in the portion of the third connecting pipe 22 with the thermal sensor 31 and the pressure sensor 32. Referenece $SC_H$ represents an upper limit of the controlled subcooling degree as a control target. Reference $SC_L$ represents a lower limit of the controlled subcooling degree as the control target.

The operation of the air conditioning device of the eleventh embodiment will be described in detail.

Firstly, the case wherein only room heating is carried out will be explained in reference to FIG. 32.

Figure 32:
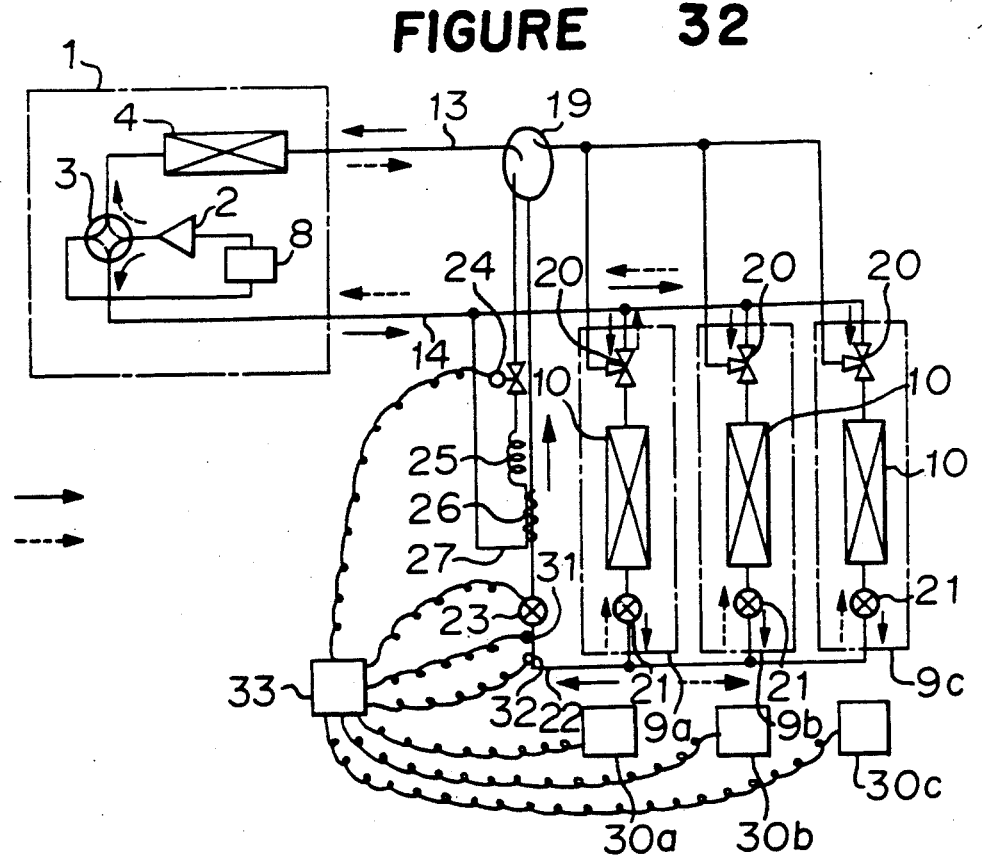
FIG. 32 is a schematic diagram showing the operation which is carried out when either only room cooling or only room heating is performed in the eleventh embodiment of FIG. 31.

As indicated in arrows of solid line in FIG. 32, the flow of the refrigerant on room heating only is the same as that in the ninth embodiment as indicated in arrows of solid line in FIG. 27.

The controller 33 receives indoor units operation mode signals from the indoor unit operation controllers 30a-30c. When it detects that all indoor units 9a-9c are under heating operation, the solenoid valve 24 is fully closed, and the second electric expansion valve 23 is fully opened in accordance with the heating operation mode shown in the control flow chart of FIG. 35-1. As a result, the refrigerant which has been condensed and liquefied in the indoor heat exchangers 10 passes through the second electric expansion valve 23, and flows into the outdoor heat exchanger 4 of the outdoor unit 1 through the first connecting pipe 13. In the outdoor heat exchanger, the refrigerant carries out heat exchanging to be gasified, and is inspired into the compressor 2 again. In this way, the circulation cycle is formed to carry out room heating.

Secondly, the case wherein room cooling only is performed will be explained in refence to FIG. 32. As indicated in arrows of broken line in FIG. 32, the flow of the refrigerant on room cooling only is the same as that in the ninth embodiment as indicated in arrows of broken line in FIG. 27.

When the controller 33 detects that it is now under the room cooling operation mode wherein all indoor units 9a-9c are on room cooling, the second electric expansion valve 23 is fully opened as shown in the control flow chart of FIG. 35-1.

The refrigerant which has flowed into the indoor units 9a-9c is depressurized to a low pressure by the first electric expansion valves 21, flows into the indoor heat exchangers 10, and carries out heat exchanging with (cooling) indoor air to be evaporated and gasified. The refrigerant thus gasified passes through the three port switching valves 20, and is inspired into the compressor 1 through the second connecting pipe 14. In this way, the circulation cycle is formed to carry out room cooling.

At this time, the controller 33 makes the solenoid valve 24 fully opened as shown in the flow chart of FIG. 35-1, and a portion of the liquid refrigerant which passes through the gas-liquid separator 19 enters the bypass pipe 27. After the liquid refrigerant which has flowed into the bypass pipe 27 is depressurized to a low pressure by the capillary 25, the refrigerant carries out heat exchanging with the third connecting pipe 22 (cooling the refrigerant in the third connecting pipe 22) to be gasified, and flows into the second connecting pipe 14. The liquid refrigerant which has flowed into the third connecting pipe 22 is cooled in this way by the refrigerant in the bypass pipe 27 at the heat exchanging portion 26, becomes slightly subcooled, and flows into the indoor units 9a-9c through the second electric expansion valve 23.

Thirdly, the case wherein room heating is principally performed under the room cooling and room heating concurrent operation will be described in detail with reference to FIGS. 33, and FIGS. 35-1 through 35-3.

Figure 33:
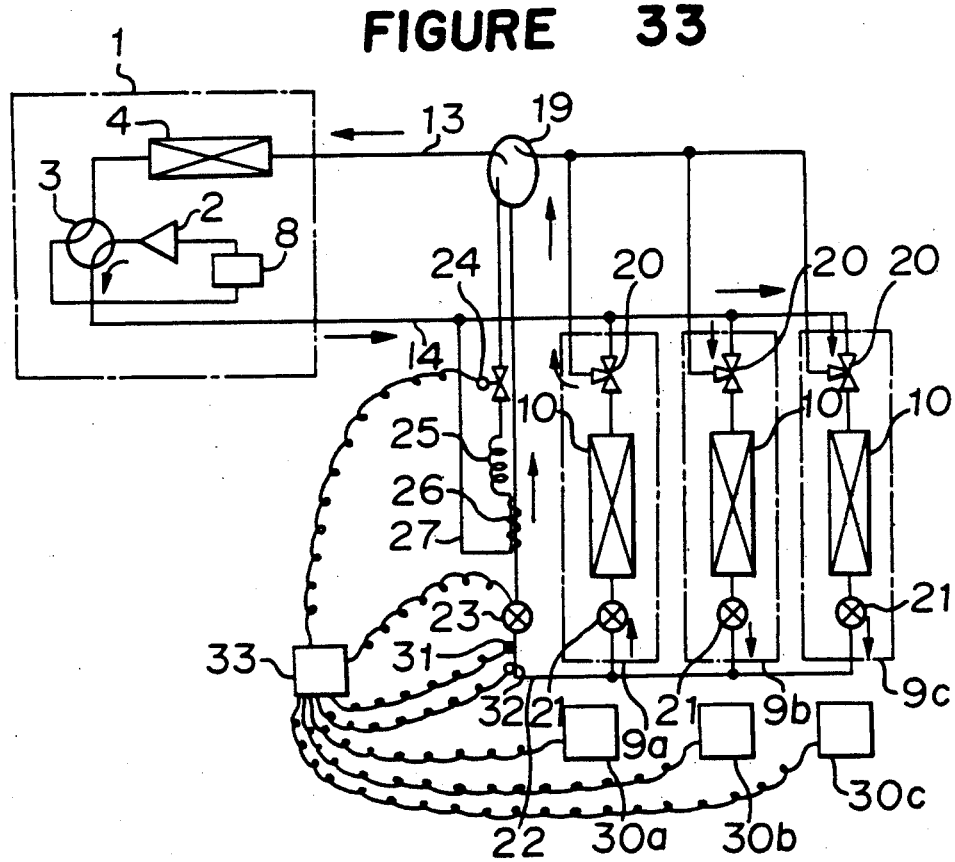
FIG. 33 is a schematic diagram showing the operation which is carried out when room heating operation capacity is greater than room cooling operation capacity in the eleventh embodiment of FIG. 31.
Figure 34:
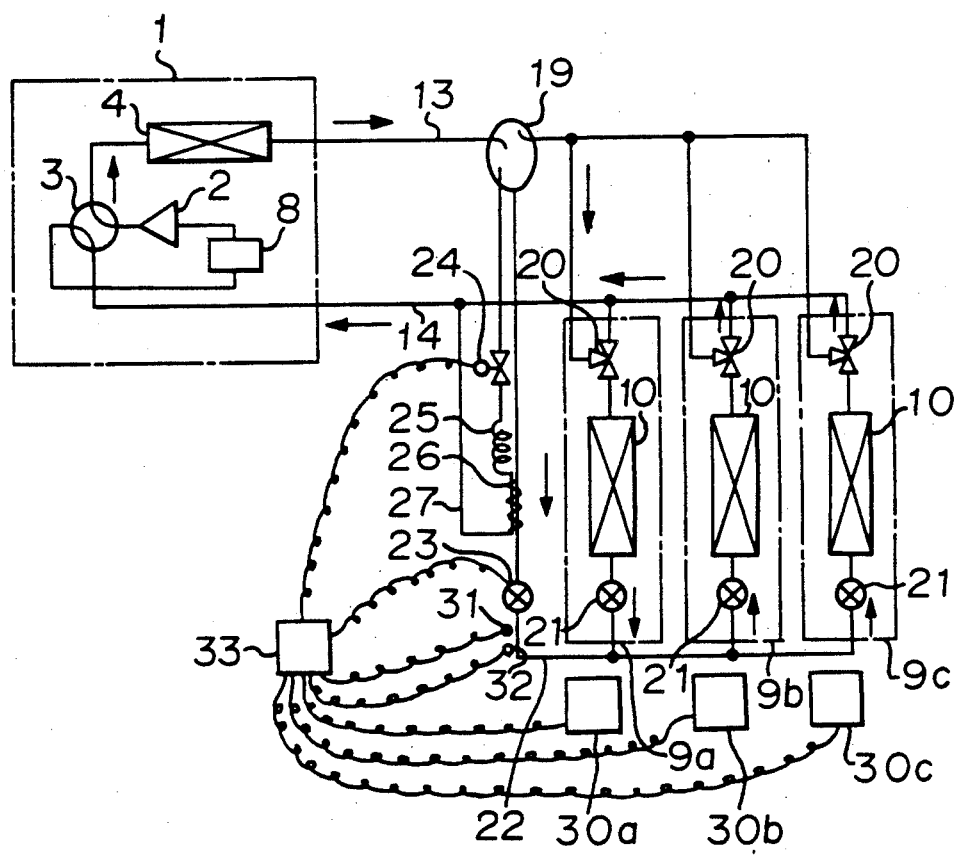
FIG. 34 is a schematic diagram showing the operation which is carried out when room cooling operation capacity is greater than room heating operation capacity in the eleventh embodiment of FIG. 31.

As indicated in arrows of solid line in FIG. 33, the flow of the refrigerant in this case is the same as that in the ninth embodiment as indicated in arrows of solid line in FIG. 28.

The operation of the second electric expansion valve 23 under this room cooling and room heating concurrent operation will be explained in detail with reference to FIGS. 35-1 and 35-2.

The controller 33 receives an operation mode signal from each indoor unit through the indoor unit operation controlers 30a-30c, and signals from the thermal sensor 31 and the pressure sensor 32 which are arranged in the third connecting pipe 22. When the controller 33 detects based on such input signals that it is now under the room cooling and room heating concurrent operation wherein room heating is principally performed, the controller 33 fully closes the solenoid valve 24, and calculates, based on the signals from the thermal sensor 31 and the pressure sensor 32, the subcooling degree SC of the liquid refrigerant which is flowing through the third connecting pipe 22. In addition, the controller judges whether SC is in the range of the control subcooling degree $SC_L$-$SC_H$ or not. When SC is in the range, the controller 33 outputs to the second electric expansion valve 23 the present command value $X_{V2}$ on the opening degree for the second electric expansion valve 23 as a new command value $X_{V2}^*$.

When SC is greater than the upper limit $SC_H$ of the control subcooling degree, the controller 33 outputs to the second electric expansion valve 23 as a new command value $X_{V2}^*$ the value which is obtained by adding the variation $\Delta X_{V2}$ to the present command value $X_{V2}$. When SC is smaller than lower limit $SC_L$ of the control subcooling degree, the controller 33 outputs to the second electric expansion valve 23 as a new command value $X_{V2}^*$ the value which is obtained by subtracting $\Delta X_{V2}$ from $X_{V2}$. In this way, the opening degree of the second electric expansion valve 23 can be adjusted to maintain the subcooling degree of the liquid refrigerant in a predetermined range, the liquid refrigerant being in the portion of the third connecting pipe 22 where the thermal sensor 31 and the pressure sensor 32 are arranged. The control subcooling degree in this portion is set so that it is slightly smaller than the control subcooling degree of the first electric expansion valves 21 corresponding to room heating indoor units 9b and 9c.

Fourthly, the case wherein room cooling is principally performed under the room cooling and room heating concurrent operation will be described in detail in reference to FIG. 34 and FIGS. 35-1 and 35-3.

When the controller 33 detects based on the operation mode signals from the indoor units and the signals from the thermal sensor 31 and the pressure sensor 32 that it is now under the room cooling and room heating concurrent operation wherein room cooling is principally performed, the controller 33 fully opens the solenoid valve 24, and calculates, based on the signals from the thermal sensor 31 and the pressure sensor 32, the subcooling degree SC of the liquid refrigerant which is flowing through the third connecting pipe 22 with these sensors arranged in it. The controller 33 judges whether SC is in the range of the control subcooling degree $SC_L$-$SC_H$ as control target or not. When SC is in the range, the controller 33 outputs to the second electric expansion valve 23 the present command value $X_{V2}$ on the opening degree for the second electric expansion valve 23 as a new command value $X_{V2}^*$.

When SC is greater than the upper limit $SC_H$ of the control subcooling degree as control target, the value which is obtained by subtracting the variation $\Delta X_{V2}$ from the present command value $X_{V2}$ is output to the second electric expansion valve 23 as a new command value. When SC is smaller than the lower limit $SC_L$ of the control subcooling degree as control target, the value which is obtained by adding $\Delta X_{V2}$ to $X_{V2}$ is output to the second electric expansion valve 23 as a new command value $X_{V2}^*$.

As explained, the opening degree of the second electric expansion valve 23 is controlled so that the subcooling degree of the liquid refrigerant which is in the portion of the third connecting pipe 22 where the thermal sensor 31 and the pressure sensor 32 are arranged is maintained in a predetermined range.

Although in the eleVenth embodiment the thermal sensor 31 and the pressure sensor 32 which detect the subcooling degree of the third connecting pipe 22 are arranged between the second electric expansion valve 23 and the first electric expansion valves 21, respectively, the present invention is not limited to such arrangement. Like the twelfth embodiment of FIG. 36, a thermal sensor 31a and a pressure sensor 32a can be arranged in each indoor unit so that the opening degree of the second electric expansion valve 23 is controlled to maintain the smallest one among the subcooling degrees of the indoor units in a predetermined range. This arrangement allows the refrigerant adjacent to the inlet of the first electric expansion valve 21 of a room cooling indoor unit to be always in a liquid state, regardless of the length of the connecting pipe 22 in each indoor unit, and the difference in level of each indoor unit.

Although the eleventh embodiment is so constructed that the controller 33 receives indoor unit operation mode signals and the opening degree signal of the first electric expansion valves 21 from the indoor unit operation controllers 33a–33c, a refrigerant temperature signal from the thermal sensor 31, and a pressure signal from the pressure sensor 32, the present invention is not limited to such arrangement. Any arrangement wherein such signals can be input is also applicable to the present invention. Although the explanation on the eleventh embodiment has been made to the case wherein the plural indoor units haVe the same capability, the present invention is also applicable to the case wherein the indoor units are different from each other in terms of their capacity. In the latter case, the air conditioning device according to the present invention is so constructed that the controller 33 receiVes a signal indicative of the capacity of each indoor unit as well as a indoor unit operation mode signal indicating whether each indoor unit is cooling or heating. In this manner, the controller 33 can detects the total amount of the room cooling and room heating operation capacity of the indoor units to detect the operation modes. Or, the controller 33 can receiVe an operation mode signal from the outdoor unit to detect the operation modes, thereby carrying out an adequate control.

Although the eleventh embodiment uses the capillary tube 25 having a fixed flow rate as the third flow controller, an electric expansion valve like the first and second flow controllers 21 and 23 can be utilized. In the latter case, the opening degree of the electric expansion valve is controlled by the controller 33.

The switching valves 20 and the first electric expansion valves 21 in the indoor units can be arranged either in the indoor unit casings or outside of the indoor unit casings.

We claim:
1. An air conditioning device comprising:
   a single outdoor unit including a compressor, a four port valve, an outdoor heat exchanger, an accumulator and the like;
   a plurality of indoor units connected in parallel to be outdoor unit through a first refrigerant-carrying means and a second refrigerant-carrying means;
   switching valves for selectively connecting one end of the indoor units to either first refrigerant-carrying means or the second refrigerant-carrying means; and
   a third refrigerant-carrying means having one end connected to the other end of the indoor units through first flow controllers, and the other end connected to the first refrigerant-carrying means through a second flow controller.

2. An air conditioning device according to claim 1, wherein there is provided a controller for controlling the opening degree of the second flow controller depending on the opening degree of the first flow controller and the conditions of the refrigerant in the third refrigerant-carrying means between the first and second flow controllers.

3. An air conditioning device according to claim 1, wherein there is provided a controller for controlling the volume of the compressor and the heat exchanging quantity of the outdoor heat exchanger depending on the operation modes of the respective indoor units and the difference between set temperatures for the respective indoor units and actual temperatures in the respective rooms with the indoor units installed.

4. An air conditioning device according to claim 1, wherein the third refrigerant-carrying means has the other end connected to the first refrigerant-carrying means through a gas-liquid separator, and there is connected a receiver between the first flow controllers and the second flow controller in the third refrigerant-carrying means.

5. An air conditioning device according to claim 1, wherein there is provided a junction device which connects the outdoor unit to the indoor units and contains a switching valve, the second flow controller, a first branch joint and a second branch joint, the first branch joint selectively connecting the switching valve to the first and the second refrigerant-carrying means, the second branch joint connecting the second flow controller to the respective first flow controllers.

6. An air conditioning device comprising:
   a single outdoor unit including a compressor, a four port valve, an outdoor heat exchanger, an accumulator and the like;
   a plurality of indoor units connected in parallel to the outdoor unit through a first refrigerant-carrying means and a second refrigerant-carrying means;
   switching valves for selectively connecting one end of the indoor units to either the first refrigerant-carrying means or the second refrigerant-carrying means;
   a gas-liquid separator provided in either the frist refrigerant-carrying means or the second refrigerant-carrying means;
   a third refrigerant-carrying means having one end connected to the other end of the inddor units through first flow controllers, and having the other end connected to the gas-liquid separator through a second flow controller;
   a bypass refrigerant-carrying means having one end connected tot he gas-liquid separator through a switching device and a flow controllerm and having the other end connected to the second refrigerant-carrying means where the gas-liquid separator is not provided; and a heat-exchanging portion which is provided in the bypass refrigerant-carrying means and carries out heat-exchanging at a position between the gas-liquid separator and the second flow-controller.

7. An air conditioning device according to claim 6, wherein there is provided a controller for controlling the opening and closing of teh switching device depending on the operation modes of the respective indoor units and the conditions of a refrigerant in the third refrigerant-carrying means between the first and second flow controllers.

* * * * *